US010112186B2

(12) United States Patent
Liu et al.

(10) Patent No.: US 10,112,186 B2
(45) Date of Patent: Oct. 30, 2018

(54) BETA MOLECULAR SIEVE, PREPARATION METHOD THEREFOR AND HYDROGENATION CATALYST CONTAINING SAME

(71) Applicants: CHINA PETROLEUM & CHEMICAL CORPORATION, Beijing (CN); Fushun Research Institute of Petroleum and Petrochemicals, SINOPEC CORP., Fushun, Liaoning (CN)

(72) Inventors: Chang Liu, Liaoning (CN); Fenglai Wang, Liaoning (CN); Keqi Wang, Liaoning (CN); Yanze Du, Liaoning (CN); Hong Zhao, Liaoning (CN); Minghua Guan, Liaoning (CN)

(73) Assignees: CHINA PETROLEUM & CHEMICAL CORPORATION, Beijing (CN); FUSHUN RESEARCH INSTITUTE OF PETROLEUM AND PETROCHEMICALS, SINOPEC CORP., Fushun, Liaoning (CN)

( * ) Notice: Subject to any disclaimer, the term of this patent is extended or adjusted under 35 U.S.C. 154(b) by 230 days.

(21) Appl. No.: 15/036,368

(22) PCT Filed: Oct. 28, 2014

(86) PCT No.: PCT/CN2014/089699
§ 371 (c)(1),
(2) Date: May 12, 2016

(87) PCT Pub. No.: WO2015/078256
PCT Pub. Date: Jun. 4, 2015

(65) Prior Publication Data
US 2016/0263563 A1 Sep. 15, 2016

(30) Foreign Application Priority Data

Nov. 26, 2013 (CN) .......................... 2013 1 0604900
Nov. 26, 2013 (CN) .......................... 2013 1 0604963
Nov. 26, 2013 (CN) .......................... 2013 1 0605187
Nov. 26, 2013 (CN) .......................... 2013 1 0605205

(51) Int. Cl.
*B01J 29/06* (2006.01)
*B01J 29/78* (2006.01)
(Continued)

(52) U.S. Cl.
CPC ........... *B01J 29/7815* (2013.01); *B01J 29/06* (2013.01); *B01J 29/061* (2013.01); *B01J 29/072* (2013.01); *B01J 29/084* (2013.01); *B01J 29/146* (2013.01); *B01J 29/166* (2013.01); *B01J 29/7007* (2013.01); *B01J 29/7615* (2013.01); *B01J 29/78* (2013.01); *B01J 29/80* (2013.01); *B01J 35/002* (2013.01); *C01B 39/026* (2013.01); *C01B 39/46* (2013.01); *C10G 47/16* (2013.01); *C10G 47/20* (2013.01); B01J 2029/062 (2013.01); B01J 2229/16 (2013.01); B01J 2229/186 (2013.01);
(Continued)

(58) Field of Classification Search
CPC ........ B01J 29/06; B01J 29/061; B01J 29/072; B01J 29/084; B01J 29/146; B01J 29/166; B01J 29/7007; B01J 29/7615; B01J 29/78; B01J 29/80; B01J 2029/062; B01J 29/7815; B01J 2229/16; B01J 2229/32; B01J 2229/36; B01J 2229/186; B01J 2229/20; B01J 2229/26; C01B 39/46
USPC ......... 502/64, 60, 63, 66, 67, 69, 74, 79, 85
See application file for complete search history.

(56) References Cited

U.S. PATENT DOCUMENTS 5,279,726 A 1/1994 Ward
5,350,501 A 9/1994 Ward
(Continued)

FOREIGN PATENT DOCUMENTS

CN 1088247 A 6/1994
CN 1105646 A 7/1995
(Continued)

OTHER PUBLICATIONS

Sakthivel et al. "Novel Rout to Synthesize Nanosized β-Zeolite with High Surface Area", Chemistry Letters, vol. 36, No. 7, 2007, pp. 894-895.
Srivastava et al. "Dealumination of Zeolite Beta Catalyst Under Controlled Conditions for Enhancing its Activity in Acylation and Esterification", Catalyst Letters, vol. 130, 2009, pp. 655-663.

Primary Examiner — Elizabeth D Wood
(74) Attorney, Agent, or Firm — Novick, Kim & Lee, PLLC; Allen Xue

(57) ABSTRACT

Disclosed are a beta molecular sieve, a preparation method therefor, and a hydrogenation catalyst containing same. The properties of the beta molecular sieve are as follows: the molar ratio of $SiO_2/Al_2O_3$ is 30-150, the non-framework aluminum accounts for not more than 2% of the total aluminum, and the silicon atoms coordinated in a Si(OAl) structure account for not less than 95% of the silicon atoms in the framework structure. The preparation method comprises: contacting the raw material powder of the beta molecular sieve with normal pressure and dynamic water vapor, and then with ammonium fluosilicate. The beta molecular sieve of the present invention has the features of a uniform skeleton structure of silicon and aluminum, an appropriate acidity, and a reasonable pore structure, and is suitable as an acidic component of a hydro-upgrading catalyst and a hydro-cracking catalyst for diesel oil.

20 Claims, 1 Drawing Sheet

(51) Int. Cl.
- *B01J 29/08* (2006.01)
- *B01J 29/80* (2006.01)
- *B01J 29/072* (2006.01)
- *B01J 29/14* (2006.01)
- *B01J 29/16* (2006.01)
- *C10G 47/16* (2006.01)
- *C10G 47/20* (2006.01)
- *C01B 39/02* (2006.01)
- *B01J 29/70* (2006.01)
- *B01J 29/76* (2006.01)
- *C01B 39/46* (2006.01)
- *B01J 35/00* (2006.01)

(52) U.S. Cl.
CPC ........ *B01J 2229/20* (2013.01); *B01J 2229/26* (2013.01); *B01J 2229/32* (2013.01); *B01J 2229/36* (2013.01); *B01J 2229/42* (2013.01); *C01P 2006/12* (2013.01); *C01P 2006/14* (2013.01); *C10G 2400/04* (2013.01)

(56) References Cited

U.S. PATENT DOCUMENTS

| | | |
|---|---|---|
| 5,447,623 A | 9/1995 | Ward |
| 5,536,687 A | 7/1996 | Ward |
| 2007/0015928 A1* | 1/2007 | Zhang .................. B01J 29/7615 554/125 |
| 2008/0171901 A1 | 7/2008 | Reynolds et al. |
| 2010/0179361 A1* | 7/2010 | Goergen .................. B01J 29/06 585/481 |

FOREIGN PATENT DOCUMENTS

| | | |
|---|---|---|
| CN | 1284404 A | 2/2001 |
| CN | 1393521 A | 1/2003 |
| CN | 1393522 A | 1/2003 |
| CN | 1157258 C | 7/2004 |
| CN | 1166560 C | 9/2004 |
| CN | 101450318 A | 6/2009 |
| CN | 101632938 A | 1/2010 |

* cited by examiner

BETA MOLECULAR SIEVE, PREPARATION METHOD THEREFOR AND HYDROGENATION CATALYST CONTAINING SAME

FIELD OF THE INVENTION

The present invention relates to a beta molecular sieve (herein also called β zeolite) and preparation method thereof and a hydrogenation catalyst containing the β zeolite. The β zeolite provided by the present disclosure can be taken not only as an active component of a hydro-cracking catalyst but also as an active component of a hydro-upgrading catalyst for upgrading inferior diesel oil.

BACKGROUND OF THE INVENTION

The hydrocracking technology has features of high adaptability of raw material, high flexibility of product scheme, high selectivity of target product, high product quality, high additional value and the like, and the hydrocracking technology can directly transform various heavy inferior raw materials into clean fuel oil and high quality chemical raw materials. The hydrocracking technology has become one of the most important heavy oil deep conversion processes in modern refining and petrochemical industry and is widely used in the world. The hydrocracking technology has become the core technology of "refining-chemical-chemical fiber" combining in modern refining industry. The hydro-upgrading technology transforms various inferior diesel oil into high quality diesel oil or mixed components thereof in a moderate process condition, enables efficiently improving quality of the diesel oil, especially significantly reduces density of the diesel oil, aromatic content, S and N content and $T_{95}$ point, and significantly increases the cetane number of the diesel oil. Some catalyst further has the capability of reducing the solidification point of the diesel oil. Thus the hydro-upgrading technology is ideal technology for upgrading inferior diesel oil for refining enterprise.

The current key components for cracking in hydrocracking catalyst are usually Y zeolite and β zeolite. Compared with Y zeolite, β zeolite has three dimensional 12-membered ring aperture structures instead of a supercage structure in Y zeolite, and has a main feature of bi-6-membered ring unit cavity structure with two 4-membered rings and four 5-membered rings, which belongs to cubic system. The silica alumina structure of the β zeolite has diversity and complexity. The skeleton structure of the β zeolite is more complex than that of the Y zeolite. Two linear pores in three mutually crossed pore systems are mutually orthogonal and vertical to [001] direction, in which the pore has a size of 0.57 nm×0.75 nm. The third 12-membered ring pore system is parallel to the [001] direction and is a non-linear pore, in which the pore has a size of 0.56 nm×0.65 nm. The skeleton silica alumina structure of the fully crystallized β zeolite also has diversity. The skeleton silica alumina structure is a four-coordinated structure and is the main body of the total silica alumina existence form in the zeolite, and its basic structure consists of Si(4Al), Si(3Al), Si(2Al), Si(1Al), and Si(0Al) structural units of different contents and is mainly in the form of Si(3Al) and Si(2Al). In addition, the zeolite further has six-coordinated non-skeleton aluminum. The silica alumina existence form and content of these structures vary in subsequently different modifying processes, thereby causing different catalytic performances.

The existing method for modifying a β zeolite (e.g., CN1105646A) generally comprises first ion exchanging with ammonium to remove sodium, calcining at a high temperature to remove the occluded template (organic amine), and conducting dealuminization and hydrothermal treatment at a constant pressure, to significantly increase the silica to alumina ratio of the β zeolite. Particularly, in the process of calcining at a high temperature to remove amine, patents such as CN1157258C, CN1166560C, etc. focus on segmented calcination to remove amine, which introduce complex preparation process. Moreover, before segmented calcination to remove amine, the zeolite is subjected to ammonium salt solution to replace sodium. Sodium ion here is a balance of the negative charge in the zeolite skeleton (generally formed by the skeleton aluminum), whereas the treatment for removing organic amine by calcination after sodium removal (regardless of one-step high temperature treatment or multi-step treatments) intensifies the skeleton dealuminization of the zeolite with non-selective skeleton dealuminization, which causes an inhomogeneous skeleton structure of the modified zeolite and large defects, and forms a large number of six-coordinated non-skeleton aluminum structure in the pore (which blocks the pore, partially covers the acid center of the skeleton and easily causes undesired cracking reaction). The subsequent acid treatment or hydrothermal treatment continues destroying the skeleton structure of the zeolite, such that there exist Si(X—Al) structures with different proportions and a certain amount of non-skeleton structures in the zeolite, and the zeolite has acid centers with different strengths showing different cracking performances, which can significantly affect the selectivity of the target product. Precisely because of the complexity of the silica alumina structure in the β zeolite, using the abovementioned modifying methods causes inhomogeneous skeleton structure of the modified zeolite and directly affects the acid strength and acid density of the modified zeolite, thereby affecting the performance of the hydrocracking catalyst.

CN101450318A discloses a method for modifying a β zeolite. The method comprises exchanging the sodium type β zeolite with ammonium salt, and then impregnating the zeolite with a phosphorous compound solution and a transition metal compound solution, to yield a β zeolite with larger BET surface area and higher relative crystallinity, which can be further subjected to shape-selective cracking to generate micromolecule olefin.

CN1393522A discloses a method for modifying a β zeolite. The method comprises the following processes: (1) directly conducting ammonium salt exchanging on the fully crystallized β zeolite, (2) filtering, washing, drying and calcining the β zeolite after ammonium salt exchanging, (3) conducting an acid treatment on the β zeolite after calcining to remove ammonium, and filtering, (4) conducting hydrothermal treatment under pressure on the β zeolite after the acid treatment. In the method, the β zeolite is firstly subjected to an inorganic acid treatment, and then to a hydrothermal treatment, the skeleton structure of the zeolite is partially destroyed in such a process, the crystallinity of the zeolite is decreased, and a large bulk of non-skeleton structure left in the pore of the zeolite which is difficult to remove, and the acid distribution and acid strength of the modified zeolite will be affected. In addition, the method further comprises a high temperature hydrothermal treatment after the acid treatment, forming a certain amount of non-skeleton aluminum in the zeolite, which directly affects the pore structure and acid property of the modified zeolite. The change of the acid distribution and acid property of the zeolite will directly affect performance of the catalyst prepared by taking the modified zeolite as the cracking component, and especially on the property of the diesel oil and chemical materials. Moreover, the process of modifying the zeolite in this method takes a long time, and the yield of the target zeolite in the preparation process is low. Meanwhile, the multi-step modification treatment greatly increases the modification cost and energy consumption. U.S. Pat. No. 5,350,501, U.S. Pat. No. 5,447,623, U.S. Pat. No. 5,279,726, and U.S. Pat. No. 5,536,687 introduce a catalyst containing both a β zeolite and a Y zeolite. The catalyst comprises the following components when used for producing middle distillate oil: a Y zeolite (1-15 wt %), a β zeolite (1-15 wt %), amorphous silica alumina, alumina, and metal W and Ni. The β zeolite used therein is a hydrogen β zeolite obtained by ion exchanging and calcining to remove the template. The catalyst does not have high activity and selectivity of middle distillate oil, which is difficult to meet the need of improving the throughput of the device and further increasing production of the middle distillate oil for the refinery.

CN1393521A discloses a middle distillate oil hydrocracking catalyst and preparation method thereof, wherein the carrier of the catalyst is amorphous silica-alumina, alumina, and a complex zeolite of Y and β. The complex zeolite is obtained by calcining the β zeolite raw powder at a high temperature to remove the template, mixing with modified Y zeolite, and then treating with a mixed solution of $H^+$ and $NH_4^+$. In this method, first calcining the β zeolite raw powder at a high temperature to remove the template will affect the skeleton structure of the zeolite, significantly decrease the crystallinity of the zeolite and affect the acidity. The catalyst prepared in this way does not have high activity, and the product quality of the middle distillate oil of the aviation kerosene and diesel oil still needs to be further improved.

SUMMARY OF THE INVENTION

To overcome the shortages of the prior art, the invention provides a β zeolite with uniform skeleton silica alumina structure, preparation method thereof and hydrogenation catalyst containing the β zeolite. The β zeolite provided in the present disclosure has appropriate acidity and reasonable pore structure. The preparation method provided in the present disclosure has less modifying steps, high yield of target modified zeolite and low preparation cost. The hydrocracking catalyst prepared by taking the β zeolite of the present invention as the cracking component is suitable for hydrocracking heavy VGO to produce low solidification point diesel oil and improve the property of hydrocracking tail oil. The hydrocracking catalyst prepared by taking the β zeolite of the present invention and Y zeolite together as the cracking components is suitable for hydrocracking heavy VGO to produce high quality middle distillate oil. The diesel oil hydro-upgrading catalyst prepared by using the β zeolite of the present invention as the cracking component is used for upgrading inferior diesel oil to produce high quality diesel oil with high cetane number, large density decrease scope, low solidification point, and the like.

In accordance with the first aspect of the present invention, it provides a β zeolite comprising the following properties: a $SiO_2/Al_2O_3$ molar ratio of 30-150, preferably of 40-150; non-skeleton aluminum of not more than 2%, preferably of not more than 1% based on the total aluminum; Si(0Al)-coordinated silicon atom of not less than 95%, preferably of 95-99%, and further preferably of 96-99% based on silicon atom in a skeleton structure.

In accordance with the second aspect of the present invention, it provides a preparation method of a β zeolite, comprising:
(1) contacting β zeolite raw material powder with normal pressure and dynamic water vapor at a temperature of 500-650° C. for 5-10 hours; and
(2) contacting the product from step (1) with ammonium hexafluorosilicate, then filtering, washing and drying to obtain the β zeolite.

In accordance with the third aspect of the present invention, it provides a hydrogenation catalyst comprising a hydrogenation active metal component and a carrier, wherein the carrier contains the abovementioned β zeolite provided in the present invention.

Preferably, the carrier of the hydrogenation catalyst further contains alumina.

Preferably, the carrier of the hydrogenation catalyst further contains a Y zeolite and/or amorphous silica-alumina.

The β zeolite provided in the present invention has features of uniform skeleton silica alumina structure, appropriate acidity, reasonable pore structure and the like, and enables the catalyst to have higher activity and isomerization ability when used as a cracking component.

Taking the β zeolite as the acidic component and taking appropriate amorphous silica-alumina as the second cracking component, the cracking catalyst both brings respective performance characteristics into full play and produce good concerted catalysis, and thus has good effect in cyclic-hydrocarbon selective ring opening, alkane isomerization, heavy fraction moderate hydrocracking, aromatics saturation and heteroatom removal performances while having improved hydrocracking activity. The hydrocracking catalyst has high activity, and can maximize the production of the low solidification point diesel oil while producing high quality hydrocracking tail oil.

The hydrogenation catalyst taking the β zeolite and the Y zeolite together as the cracking center can be used as hydrocracking catalyst which both can bring respective performance characteristics into full play and can enable the two kinds of zeolites to have concerted catalysis, i.e., the β zeolite has good isomerization activity on the long side chain on alkane or aromatics, which can efficiently reduce the solidification point of the product. Meanwhile, the Y zeolite has high ring opening selectivity to aromatics, which improves the product property of the target product. Thus, the hydrocracking catalyst has high activity and can produce more high quality middle distillate oil (aviation kerosene and diesel oil) and at the same time produce high quality hydrocracking tail oil.

The diesel oil hydro-upgrading catalyst prepared by taking the β zeolite of the present invention as the cracking component is used for upgrading inferior diesel oil to produce high quality diesel oil with features of high cetane number, large density decrease scope, low solidification point, and the like.

DETAILED DESCRIPTION OF THE EMBODIMENTS

I. β Zeolite

Figure 1:
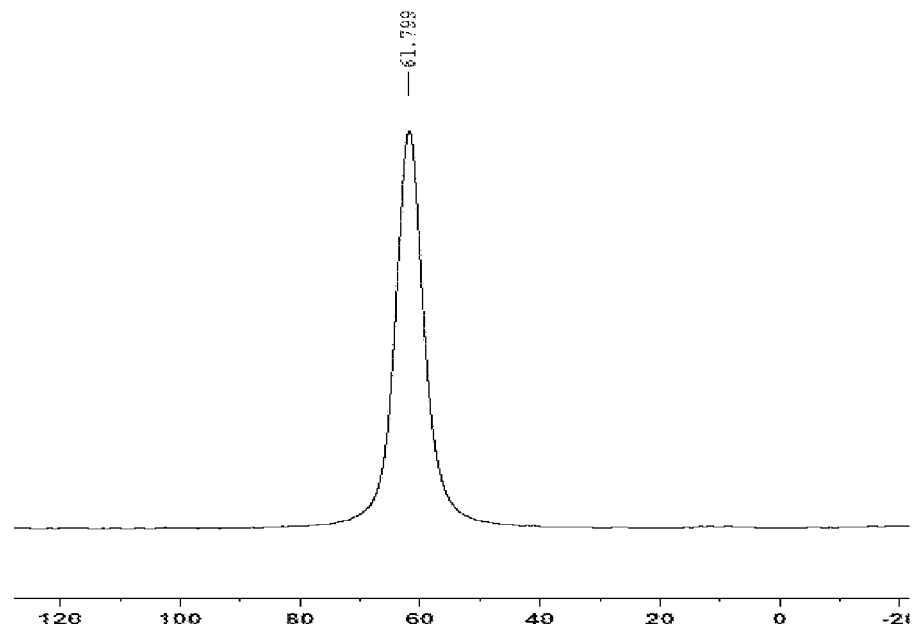
FIG. 1 is $^{27}Al$ MAS NMR spectrogram of the β zeolite of the present invention in Example 6, wherein the horizontal coordinate is ppm.

In accordance with the first aspect of the present invention, it provides a β zeolite, comprising the following properties: a $SiO_2/Al_2O_3$ molar ratio of 30-150, preferably of 40-150, and further preferably of 60-120; non-skeleton aluminum of not more than 2%, preferably of not more than 1% based on the total aluminum; Si(0Al)-coordinated silicon atom of not less than 95%, preferably of 95-99%, and further preferably of 96-99% based on silicon atom in a skeleton structure.

Preferably, the β zeolite provided in the present invention comprises the following property: a relative crystallinity of 100-140%.

Preferably, the β zeolite provided in the present invention comprises the following properties: an IR acid (infrared acid) in an amount of 0.1-0.5 mmol/g, preferably of 0.15-0.45 mmol/g; and a medium strong acid in an acid amount of not less than 80%, preferably of 80-95%, and further preferably of 85-95% based on the total acid amount, as measured by $NH_3$-TPD method.

Preferably, the β zeolite provided in the present invention comprises the following properties: $Na_2O \leq 0.15$ wt %, preferably $\leq 0.10$ wt %.

Preferably, the β zeolite provided in the present invention comprises the following properties: a BET surface area of 400-800 $m^2/g$, preferably of 500-700 $m^2/g$; a total pore volume of 0.30-0.50 mL/g.

In the β zeolite of the present invention, total aluminum refers to the total of aluminum in the skeleton aluminum and non-skeleton aluminum in zeolite. The non-skeleton aluminum is aluminum present in the form of six-coordinated structure in zeolite. The skeleton aluminum is aluminum present in the form of four-coordinated structure in zeolite. Silicon atom in the skeleton structure (also called "skeleton silicon atom") is the total of silicon atom coordinated with Si(4Al), Si(3Al), Si(2Al), Si(1Al) and Si(0Al). Si(4Al), Si(3Al), Si(2Al), Si(1Al) and Si(0Al) are four-coordinated structure (i.e., skeleton structure) in different coordination states with silicon atom in the silicon oxygen tetrahedron. Si(4Al) refers to a four-coordinated structure with silicon atom in the silicon oxygen tetrahedron directly connected only to 4 aluminum oxygen tetrahedrons, i.e., $Si[(OAl)_4]$; Si(3Al) refers to a four-coordinated structure with silicon atom in the silicon oxygen tetrahedron directly connected to 3 aluminum oxygen tetrahedrons and 1 silicon oxygen tetrahedron, i.e., $Si[(OAl)_3(OSi)_1]$; Si(2Al) refers to a four-coordinated structure with silicon atom in the silicon oxygen tetrahedron directly connected to 2 aluminum oxygen tetrahedrons and 2 silicon oxygen tetrahedrons, i.e., $Si[(OAl)_2(OSi)_2]$; Si(1Al) refers to a four-coordinated structure with silicon atom in the silicon oxygen tetrahedron directly connected to 1 aluminum oxygen tetrahedron and 3 silicon oxygen tetrahedrons, i.e., $Si[(OAl)_1(OSi)_3]$; and Si(0Al) refers to a four-coordinated structure with silicon atom in the silicon oxygen tetrahedron directly connected only to 4 silicon oxygen tetrahedrons, i.e., $Si[(OSi)_4]$.

In the present invention, the $^{27}Al$ MAS NMR spectrogram is obtained by using nuclear magnetic resonance spectroscopy (NMR), thereby obtaining the proportion of skeleton aluminum and non-skeleton aluminum based on Al atom. The $^{29}Si$ MAS NMR spectrogram is obtained by using nuclear magnetic resonance spectroscopy (NMR), thereby obtaining the proportion of silicon atoms present in different coordination states (Si(4Al), Si(3Al), Si(2Al), Si(1Al) and Si(0Al)) based on Si atom.

The preparation method of the β zeolite of the present invention comprises the following steps:

(1) contacting β zeolite raw material powder with normal pressure and dynamic water vapor at a temperature of 500-650° C. for 5-10 hours; and (2) contacting the product from step (1) with ammonium hexafluorosilicate, then filtering, washing and drying to obtain the β zeolite.

In step (1), the step of contacting the β zeolite raw material powder with the atmospheric dynamic water vapor preferably includes placing the β zeolite raw material powder in a container, then introducing the water vapor from one end of the container, and discharging from the other end of the container after passing through the β zeolite raw material powder. In order to treat zeolite more uniformly, it is preferable to place zeolite in a rotary container such as a tube furnace, from one end of which the water vapor enters and goes out from the other end after passing through the β zeolite raw powder. The pressure in the container is kept at normal pressure, the treatment temperature is kept at 500-650° C., and the treatment time is 5-10 h.

Preferably, step (1) uses temperature programming with a heating rate of 50-150° C./h; when heated to 250-450° C., starting introducing the water vapor, and continuing heating to 500-650° C. and then keeping the temperature for 5-10 h.

Preferably, in step (1), the β zeolite raw material powder is synthesized by a conventional hydrothermal method with organic amine as the template, which can be one or more of tetraethylammonium hydroxide, tetramethylammonium hydroxide, tetraethylammonium bromide and the like. There is always template comprised in β zeolite raw powder in a content of 10 wt %-15 wt %. β zeolite raw powder comprises the following properties: a $SiO_2/Al_2O_3$ molar ratio of 22.5-28.5, and $Na_2O$ content of 1.0 wt %-3.0 wt %. The template content in the β zeolite raw powder can be measured by differential scanning calorimetry (DSC)-Thermogravimetry (TG), wherein TG is carried out under an argon atmosphere of gas flow of 25 mL/min, heating rate of 10° C./min from room temperature to 600° C. and the sample weight of about 10 mg with STA449C-QMS403C (Netzsch, Germany), and the lost weight between 150° C. and 500° C. of the β zeolite raw material powder is taken as the weight of template.

In step (1), the β zeolite raw material powder is treated under normal pressure and dynamic water vapor condition (preferably using water vapor of 100 wt %), wherein the water vapor passes through the zeolite raw material powder at 50-100 L/h per kilogram of the β zeolite raw material powder.

In step (2), the product obtained from step (1) contacts with ammonium hexafluorosilicate in the conditions comprising: a temperature of 40-120° C., preferably of 70-100° C.; and a time of 0.5-8.0 h, preferably of 1.0-3.0 h.

Preferably, in step (2), the product obtained from step (1) contacts with an aqueous solution of ammonium hexafluorosilicate and the concentration of the aqueous solution of ammonium hexafluorosilicate is 10-60 g/100 mL solution, and the liquid-solid volume ratio of the aqueous solution of ammonium hexafluorosilicate and the β zeolite is 3:1-15:1.

The slurry after contacting in step (2) is directly filtered, and then the filter cake is washed with water for several times. The washing generally uses deionized water to wash until the pH value of the washing liquid approximates to neutral. The washing temperature can be 50-100° C., preferably 60-90° C.; the liquid-solid volume ratio is generally 5:1-15:1; the washing time is 0.5-1.0 h until the pH value of the washing liquid approximates to neutral. The drying is preferably performed at 100-120° C. for 3-6 h.

The β zeolite modified by the method of the present invention has a yield of not less than 85 wt %. The β zeolite of the present invention has features of uniform skeleton silica alumina structure, appropriate acidity, reasonable pore structure and the like, and is suitable for use as a cracking component to enable the catalyst to have higher activity and isomerization ability.

The method of the present invention first treats the zeolite raw powder by an atmospheric dynamic hydrothermal treatment without ammonium exchanging and other pretreatment processes. The dynamic high temperature water vapor removes ammonium (template) of zeolite, selectively reduces activation energy of the skeleton aluminum, avoids the destruction to the skeleton structure of the zeolite, retains the uniformity of the skeleton structure of zeolite. The atmospheric dynamic hydrothermal treatment cooperates with the subsequent ammonium hexafluorosilicate modifying process to efficiently and uniformly remove the low energy skeleton aluminum, supplement silicon atom to the skeleton to make the skeleton structure of the zeolite more uniform and stable and bring the sodium ion in the zeolite out to reduces the sodium content in the zeolite to not more than 0.15 wt %, thereby overcoming shortages of multi-step ammonium exchanging (sodium removal), high energy consumption, high pollution and the like in the prior art. The method of the present invention can further clear the pore structure by using ammonium hexafluorosilicate to remove the resulting non-skeleton aluminum from the pore of the zeolite, achieving the aim of removing non-skeleton aluminum and making the pore of the zeolite smoother. By using the optimal modifying method, the present invention enables the modified zeolite to have a uniform skeleton silica alumina structure, a reasonable pore structure, more uniform distributions of acidic center strength and acid density, which is beneficial to provide a uniform cracking center and improve the target product selectivity of the catalyst.

II. Hydrocracking Catalyst

In accordance with the present invention, the hydrogenation catalyst of the present invention contains a hydrogenation active metal component and a carrier, wherein when the carrier contains the above mentioned β zeolite, amorphous silica-alumina and/or a Y zeolite, as well as alumina, the hydrogenation catalyst has a hydrocracking function and thus is a hydrocracking catalyst. Preferably, the hydrocracking catalyst has a BET surface area of 200-400 m$^2$/g and a pore volume of 0.35-0.60 mL/g.

In order to distinguish, in the present invention, the hydrogenation catalyst with a carrier containing the above mentioned β zeolite, amorphous silica-alumina and alumina is referred to as a first hydrocracking catalyst, and the hydrogenation catalyst with a carrier containing the above mentioned β zeolite, Y zeolite and alumina is referred to as a second hydrocracking catalyst.

Preferably, in the carrier of the first hydrocracking catalyst, based on the weight of the carrier, the β zeolite has a content of 3-20%, the amorphous silica-alumina has a content of 10-70%, and preferably of 25-55%, and the alumina has a content of 15-70%, and preferably of 25-62%.

Preferably, the amorphous silica-alumina has a SiO$_2$ content of 5-40 wt %, a pore volume of 0.6-1.1 mL/g, and a BET surface area of 300-500 m$^2$/g.

Preferably, the alumina is macroporous and/or microporous alumina, wherein the macroporous alumina has a pore volume of 0.7-1.0 mL/g and a BET surface area of 200-500 m$^2$/g, and the microporous alumina has a pore volume of 0.3-0.5 mL/g and a BET surface area of 200-400 m$^2$/g. Preferably, in the first hydrocracking catalyst, based on the total amount of the catalyst, the metal of group VIB has a content of 10.0-30.0 wt % based on oxide thereof, and the metal of group VIII has a content of 4.0-8.0 wt % based on oxide thereof.

Preferably, the hydrogenation active metal component is metal of group VIB and/or group VIII, the metal of VIB is molybdenum and/or tungsten, and the metal of group VIII is cobalt and/or nickel. The above mentioned first hydrocracking catalyst takes the β zeolite as the acidic component and appropriate amorphous silica-alumina as the second cracking component, such that the two components can both fully play performance characteristics respectively and show good concerted catalytic activity, therefore the first hydrocracking catalyst has good cyclic-hydrocarbon selective ring opening, alkane isomerization, heavy fraction moderate hydrocracking, aromatics saturation and heteroatom removal performances while improving the activity of the hydrocracking catalyst. The hydrocracking catalyst has high activity, and can maximize the production of the high quality low freezing point diesel oil while producing high quality hydrocracking tail oil.

The above mentioned first hydrocracking catalyst can be used for hydrocracking heavy VGO as the raw oil to produce low freezing point diesel oil while producing high quality hydrocracking tail oil. Preferably, the hydrocracking process uses single-stage process comprising the following conditions: a total reaction pressure of 12-20 MPa, a LHSV (Liquid hourly space velocity) of 0.5-3.0 h$^{-1}$, a hydrogen-oil volume ratio of 800:1-2000:1, and a reaction temperature of 365-435° C.

Preferably, in the carrier of the second hydrocracking catalyst, based on the weight of the carrier, the β zeolite has a content of 5-20%, the Y zeolite has a content of 10-40%, and the alumina has a content of 40-85%.

Preferably, the Y zeolite has a BET surface area of 850-950 m$^2$/g, a total pore volume of 0.43-0.55 mL/g, a SiO$_2$/Al$_2$O$_3$ molar ratio of 20-150, a cell parameter of 2.425-2.433 nm, and an IR acid in an amount of 0.1-0.4 mmol/g.

Preferably, the alumina is macroporous and/or microporous alumina, wherein the macroporous alumina has a pore volume of 0.7-1.0 mL/g and a BET surface area of 200-500 m$^2$/g, and the microporous alumina has a pore volume of 0.3-0.5 mL/g and a BET surface area of 200-400 m$^2$/g.

Preferably, the hydrogenation active metal component is metal of group VIB and/or group VIII, the metal of VIB is molybdenum and/or tungsten, and the metal of group VIII is cobalt and/or nickel.

Preferably, in the second hydrocracking catalyst, based on the amount of the catalyst, the metal of group VIB has a content of 10.0-30.0% based on oxide thereof, and the metal of group VIII has a content of 4.0-8.0% based on oxide thereof.

The above mentioned hydrocracking catalyst can be used in a method for hydrocracking heavy VGO to produce middle distillate oil (including aviation kerosene and diesel oil). Preferably, hydrocracking is performed in the conditions comprising a total reaction pressure of 12.0-20.0 MPa, a LHSV of 1.0-3.0 h$^{-1}$, a hydrogen-oil volume ratio of 800:1-2000:1, and a reaction temperature of 365-435° C. The preparation method of the hydrocracking catalyst of the present invention comprises preparation of the carrier and loading of the hydrogenation active metal component, wherein the preparation of the carrier comprises: mechanically mixing the β zeolite, amorphous silica-alumina or Y zeolite, and alumina, molding, and then drying and calcining to prepare catalyst carrier, wherein the β zeolite is prepared as above.

In the preparation method of the hydrocracking catalyst of the present invention, drying and calcining of the carrier can comprise a conventional condition, generally drying at 100-150° C. for 1-12 h, and then calcining at 450-550° C. for 2.5-6.0 h.

The carrier of the hydrocracking catalyst of the present invention is loaded with the hydrogenation active metal component (metal component of groups VIB and VIII, such as Co, Ni, Mo, W, etc.) in a conventional manner, like kneading method, impregnation method and the like. The present invention prefers to use a process of loading hydrogenation active metal component by impregnation method, and then drying and calcining to obtain hydrocracking catalyst. The impregnation method, which may be incipient impregnation, excessive impregnation or complexation impregnation, is a method of immersing the catalyst carrier in a solution containing the desired active component, drying the carrier at 100-150° C. for 1-12 h after impregnation, and then calcining at 450-550° C. for 2.5-6.0 h to obtain the final catalyst.

The alumina used in the carrier of the hydrocracking catalyst of the present invention can be any alumina suitable for a conventional hydrocracking catalyst, such as macroporous and/or microporous alumina. Herein, the macroporous alumina has a pore volume of 0.7-1.0 mL/g and a BET surface area of 200-500 $m^2/g$, and the microporous alumina being used has a pore volume of 0.3-0.5 mL/g and a BET surface area of 200-400 $m^2/g$.

A conventional molding additive such as peptization acid, extrusion assistant and the like can further be added in the preparation process of the carrier of the hydrocracking catalyst of the present invention. The hydrocracking catalyst of the present invention can be used for hydrocracking heavy fraction oil (such as VGO, CGO and DAO), wherein inferior diesel oil (coker diesel oil and FCC diesel oil, etc.) may be mixed therein to be as raw material.

III. Hydro-Upgrading Catalyst

In accordance with the present invention, when the carrier contains the above mentioned β zeolite and alumina, after cooperating with the hydrogenation active metal component, the hydrogenation catalyst can be used as a hydro-upgrading catalyst.

Preferably, the hydro-upgrading catalyst has a BET surface area of 200-400 $m^2/g$ and a pore volume of 0.35-0.60 mL/g.

Preferably, in the carrier of the hydro-upgrading catalyst, based on the weight of the carrier, the β zeolite has a content of 5-40%, and the alumina has a content of 60-95%.

Preferably, the alumina is macroporous and/or microporous alumina, wherein the macroporous alumina has a pore volume of 0.7-1.0 mL/g and a BET surface area of 200-500 $m^2/g$, and the microporous alumina has a pore volume of 0.3-0.5 mL/g and a BET surface area of 200-400 $m^2/g$. Preferably, the hydrogenation active metal component is metal of group VIB and group VIII, the metal of VIB is molybdenum and/or tungsten, and the metal of group VIII is cobalt and/or nickel.

Preferably, in the hydro-upgrading catalyst, based on the weight of the catalyst, the metal of group VIB has a content of 10.0-30.0% based on oxide thereof, and the metal of group VIII has a content of 4.0-8.0% based on oxide thereof.

When the above mentioned hydro-upgrading catalyst is used for hydro-upgrading diesel oil, preferably, the hydro-upgrading operation comprises the following conditions: a total reaction pressure of 4-12 MPa, a LHSV of 1-3 $h^{-1}$, a hydrogen-oil volume ratio of 400:1-2000:1, and a reaction temperature of 365-435° C.

The preparation method of the hydro-upgrading catalyst of the present invention comprises preparation of the carrier and loading of the hydrogenation active metal component, wherein the preparation process of the carrier comprises: mechanically mixing the β zeolite and alumina, molding, and then drying and calcining to prepare catalyst carrier, wherein the preparation method of the β zeolite is described as above.

In the preparation method of the hydro-upgrading catalyst of the present invention, drying and calcining of the carrier can comprise a conventional condition, generally drying at 100-150° C. for 1-12 h, and then calcining at 450-550° C. for 2.5-6.0 h.

The carrier of the hydro-upgrading catalyst of the present invention is loaded with the hydrogenation active metal component (metal component of groups VIB and VIII, such as Co, Ni, Mo, W, etc.) in a conventional manner, like kneading method, impregnation method and the like. The present invention preferably loads hydrogenation active metal component by using an impregnation method, and then drying and calcining to obtain hydro-upgrading catalyst. The impregnation method, which may be incipient impregnation, excessive impregnation or complexation impregnation, is a method of immersing the catalyst carrier in a solution containing the desired active component, drying the carrier at 100-150° C. for 1-12 h after impregnation, and then calcining at 450-550° C. for 2.5-6.0 h to obtain the final catalyst.

The alumina in the carrier of the hydro-upgrading catalyst of the present invention can be any alumina used in a conventional hydro-upgrading catalyst, such as macroporous and/or microporous alumina. Herein, the macroporous alumina has a pore volume of 0.7-1.0 mL/g and a BET surface area of 200-500 $m^2/g$. The microporous alumina has a pore volume of 0.3-0.5 mL/g and a BET surface area of 200-400 $m^2/g$.

A conventional molding additive such as peptization acid, extrusion assistant and the like can further be added in the preparation process of the catalyst carrier of the present invention.

The β zeolite contained in the hydro-upgrading catalyst of the present invention has appropriate cracking and good isomerization activities on long side chain alkyl group of long chain alkane, aromatics and cycloalkanes, which enables the catalyst to significantly reduce the solidification point of the diesel oil, greatly increase the cetane number of the upgraded diesel oil, and efficiently reduce the density and sulphur content of the diesel oil while keeping high diesel oil yield.

When the hydro-upgrading catalyst of the present invention is used for upgrading inferior diesel oil, it has high activity and diesel oil yield especially in a medium pressure condition (4-12 MPa) and for processing inferior diesel oil (FCC diesel oil and coker diesel oil). Moreover, the solidification point of the diesel oil is decreased significantly, and the cetane number of the upgraded diesel oil is greatly increased, the density of the diesel oil product is efficiently decreased, which can meet the need of the refinery plant for increasing operation flexibility, improving device processing capability, and further increasing the production of high quality diesel oil.

The operation of the hydro-upgrading catalyst of the present invention used for upgrading inferior diesel oil comprises the following conditions: a total reaction pressure of 4.0-12.0 MPa, a LHSV of 1.0-3.01 h$^{-1}$, a hydrogen-oil volume ratio of 400:1-1000:1, and a reaction temperature of 345-435° C. The following examples are used for illustrating the present invention in more detail, but the scope of the present invention is not limited to these examples. In the present invention, wt % is the mass fraction.

In the present invention, the BET surface area is measured by a low temperature liquid nitrogen adsorption method according to ASTM D3663-2003.

In the present invention, the pore volume is measured by a low temperature liquid nitrogen adsorption method according to ASTM D4222-2003.

In the present invention, NH$_3$-TPD method is a conventional method for measuring the acid amount of zeolite using chemical adsorption instrument Auto-Chem II 2920 produced by Micromeritics (USA), wherein the method takes ammonia as adsorption desorption medium and helium in purity of 99.99 v % as carrier gas and uses temperature programmed desorption and chromatographic analysis to obtain acid amount in different desorption temperature zone i.e., weak acid amount, mediate strong acid amount, strong acid amount and total acid amount, respectively. In detail, the measurement is performed as following: sampling 0.1 g zeolite in 20-40 mesh and heating it to 500° C. in the presence of helium in a helium flow rate of 30 mL/min and keeping for 1 h, then cooling to 150° C. and keeping for 5 mins; thereafter, feeding ammonia until the adsorption saturation for the zeolite, and then switching helium to continuous purge in a helium flow rate of 30 mL/min; in the meanwhile, heating to 250° C. with the heating rate of 10° C./min and keeping in 250° C. for 1 h, then heating to 400° C. and keeping for 1 h, and then heating to 500° C. and keeping for 1 h. During desorption of the ammonia, ammonia desorption spectra is recorded by the chromatographic analyzer accordingly. In the obtained ammonia desorption spectra, it is divided into three temperature zones according to desorption temperature i.e., 150-250° C., 250-400° C. and 400-500° C. corresponding to the acid amount of weak acid, medium strong acid and strong acid, respectively. The sum of the amount of weak acid, middle strong acid and strong acid is the total acid amount. The unit of the acid amount is mmol/g, meaning the amount of the ammonia absorbed by each gram zeolite.

In the present invention, the IR acid amount is measured by infrared spectroscopy taking pyridine as adsorbent and using Fourier infrared spectrometer (Nicolet 6700, manufactured by NICOLET, USA). In detail, the measurement is performed as following: taking 20 mg ground samples with particle size less than 200 mesh to press into slice of 20 mm in diameter, placing the slice on the sample holder of the absorption cell; taking 200 mg samples in slice shape into the hanging cup below the lower end of quartz spring, and recording the initial spring length $x_1$ in mm before adding the samples; connecting the absorption cell with adsorption tube and then beginning to vacuum to purify, once the vacuum degree reaches 4×10$^{-2}$ Pa, heating to 500° C. and keeping for 1 h to remove the surface adsorbate of the samples and in the meantime recording the spring length $x_2$ in mm as the spring length after sample purification. Then cooling the samples to room temperature and absorbing pyridine to saturation followed by heating to 160° C. and balancing for 1 h, then desorbing the physically absorbed pyridine, and at this moment, recording the spring length $x_3$ in mm as the spring length after pyridine desorption; then calculating the total acid amount according to pyridine gravimetric adsorption method and recording the infrared spectrum obtained under above procedure, wherein the spectrum band of 1545 cm$^{-1}$ corresponding to acid and the spectrum band of 1455 cm$^{-1}$ corresponding to L acid, and the ratio of B acid amount and L acid amount may be calculated according to the peak area ratio of each spectrum band, thus the total acid amount, B acid amount and L acid amount can be obtained. Wherein the total acid amount is calculated by pyridine gravimetric adsorption method according to the following details:

Hooke's law relating to relationship between extension length of spring and subjected force), f=kΔx When the spring is vertical, m=kΔx, wherein m is sample mass in gram, Δx is extension length of spring in mm, k is spring stiffness coefficient.

$$\frac{\text{the mass of absorbed pyridine}/79.1}{\text{the total acid amount}} = \frac{\text{the mass of sample}}{1 \text{ g}}$$

the total acid amount C with the unit of mmol/g, $$C = \frac{k(x_3 - x_2)}{k(x_2 - x_1) \times 79.1} \text{mol/g} = \frac{x_3 - x_2}{x_2 - x_1} \times \frac{1}{79.1} \text{mol/g} = 12.64 \times \frac{x_3 - x_2}{x_2 - x_1} \text{mmol/g}$$

Noted: 79.1 is the molar mass of pyridine with the unit of g/mol.

In the present invention, relative crystallinity is measured by XRD method using Rigaku Dmax-2500 X-ray diffractometer, using Cuk$_\alpha$ radiation and graphite single crystal filter, operating tube voltage of 35 KV, tube current of 40 mA, scanning speed (2θ) of 2°/min and scanning range of 4°-35°. A standard sample is the β zeolite raw powder used in the Example 1 of the present invention. In the present invention, the molar ratio of silica to alumina is measured by chemical method; the sodium content is measured by plasma emission spectrometry.

In the present invention, the $^{27}$Al MAS NMR spectrogram is obtained by using nuclear magnetic resonance spectroscopy (NMR), thereby obtaining the proportion of skeleton aluminum and non-skeleton aluminum based on Al atom. The $^{29}$Si MAS NMR spectrogram is obtained by using nuclear magnetic resonance spectroscopy (NMR), thereby obtaining the proportion of silicon atoms present in different coordination states (Si(4Al), Si(3Al), Si(2Al), Si(1Al) and Si(0Al)) based on Si atom. The nuclear magnetic resonance spectroscopy (NMR) uses a Bruker AVANCE III 500 type nuclear magnetic resonance spectrometer, wherein the software is Topspin 2.0. When $^{29}$Si MAS NMR spectrogram is measured, the standard substance being used is tetramethylsilane (TMS), the resonance frequency is 99 MHz, and the experiment conditions comprise a pulse width of 4-6 μs and a relaxation delay of 60-120 s. When $^{27}$Al MAS NMR spectrogram is measured, the standard substance being used is aluminum trichloride, the resonance frequency is 133 MHz, and the experiment conditions comprise a pulse width of 4-6 μs and a relaxation delay of 60-120 s. In the obtained $^{29}$Si MAS NMR spectrogram, the chemical shift corresponding to Si(4Al) is −81 to −96 ppm, the chemical shift corresponding to Si(3Al) is −96 to −100 ppm, the chemical shift corresponding to Si(2Al) is −100 to −106 ppm, the chemical shift corresponding to Si(1Al) is −106 to −109 ppm and the chemical shift corresponding to Si(0Al) is −109 to −115 ppm. In the obtained $^{27}$Al MAS NMR spectrogram, the chemical shift corresponding to the skeleton aluminum is 40-65 ppm, and the chemical shift corresponding to the non-skeleton aluminum is −10 to 10 ppm.

Example 1

β zeolite raw material powder (which is synthesized by using hydrothermal method and taking tetraethylammonium hydroxide as template, the template in β zeolite raw material powder has a content of about 11.8 wt % and the β zeolite raw material powder is provided by Fushun Branch Company of Sinopec Catalyst Co., LTD) is taken, wherein it has a chemical $SiO_2/Al_2O_3$ molar ratio of 25.5, and a $Na_2O$ content of 2.45 wt %; in its skeleton structure, the distributions of silicon atoms present in different coordination states obtained by $^{29}Si$ MAS NMR spectrogram are as follows: Si(4Al) of 7.6%, Si(3Al) of 30.6%, Si(2Al) of 32.3%, Si(1Al) of 21.0% and Si(0Al) of 8.5%. 1000 g the above mentioned β zeolite raw material powder is put in a tube furnace. When the tube furnace is heated to 300° C. by using a temperature programming method (with a heating rate of 100° C./h), the water vapor of 100 wt % is introduced with a flow of 50 L/h, and the tube furnace is heated to 550° C. and kept at that temperature for 6 h. The resulting zeolite is numbered BS-1.

Example 2

The same β zeolite raw material powder as Example 1 is taken. 1000 g the above mentioned zeolite raw powder is put in a tube furnace. When the tube furnace is heated to 300° C. by using a temperature programming method (with a heating rate of 100° C./h), the water vapor of 100 wt % is introduced with a flow of 70 L/h, and the tube furnace is heated to 600° C. and kept at that temperature for 8 h. The resulting zeolite is numbered BS-2.

Example 3

The same β zeolite raw material powder as Example 1 is taken. 1000 g the above mentioned zeolite raw powder is put in a tube furnace. When the tube furnace is heated to 300° C. by using a temperature programming method (with a heating rate of 100° C./h), the water vapor of 100 wt % is introduced with a flow of 70 L/h, and the tube furnace is heated to 650° C. and kept at that temperature for 10 h. The resulting zeolite is numbered BS-3.

Example 4

β zeolite raw material powder (which is synthesized by using hydrothermal method and taking tetraethylammonium hydroxide as template, the template in β zeolite raw material powder has a content of about 10.6 wt % and the β zeolite raw material powder is provided by Fushun Branch Company of Sinopec Catalyst Co., LTD) is taken, wherein it has a chemical $SiO_2/Al_2O_3$ molar ratio of 22.5, and a $Na_2O$ content of 2.35 wt %; in its skeleton structure, the distributions of silicon atoms present in different coordination states obtained by $^{29}Si$ MAS NMR spectrogram are as follows: Si(4Al) of 7.7%, Si(3Al) of 31.5%, Si(2Al) of 30.9%, Si(1Al) of 21.9% and Si(0Al) of 8.0%. 1000 g the above mentioned β zeolite raw powder is put in a tube furnace. When the tube furnace is heated to 400° C. by using a temperature programming method (with a heating rate of 80° C./h), the water vapor of 100 wt % is introduced with a flow of 80 L/h, and the tube furnace is heated to 600° C. and kept at that temperature for 5 h. The resulting zeolite is numbered BS-4.

Example 5

β zeolite raw material powder (which is synthesized by using hydrothermal method and taking tetraethylammonium hydroxide as template, the template in β zeolite raw material powder has a content of about 13.2 wt % and the β zeolite raw material powder is provided by Fushun Branch Company of Sinopec Catalyst Co., LTD) is taken, wherein it has a chemical $SiO_2/Al_2O_3$ molar ratio of 28.5, and a $Na_2O$ content of 2.75 wt %; in its skeleton structure, the distributions of silicon atoms present in different coordination states obtained by $^{29}Si$ MAS NMR spectrogram are as follows: Si(4Al) of 8.8%, Si(3Al) of 28.7%, Si(2Al) of 31.3%, Si(1Al) of 23.5% and Si(0Al) of 7.7%. 1000 g the above mentioned β zeolite raw powder is put in a tube furnace. When the tube furnace is heated to 280° C. by using a temperature programming method (with a heating rate of 100° C./h), the water vapor of 100 wt % is introduced with a flow of 100 L/h, and the tube furnace is heated to 620° C. and kept at that temperature for 10 h. The resulting zeolite is numbered BS-5.

Example 6

200 g zeolite BS-1 is taken and contacted with an aqueous solution of ammonium hexafluorosilicate with a concentration of 15 g ammonium hexafluorosilicate/100 mL solution at 80° C. for 2 h, in which the liquid-solid volume ratio is 5:1. After that, the slurry is filtered to obtain filter cake, and then the filter cake is washed with deionized water at 75° C. for 40 min, in which the liquid-solid volume ratio is 10:1. When the pH value of the washing liquid approximates to 7, the washing ends. The filter cake is dried in an oven at 120° C. for 5 h to obtain β zeolite of the present invention which is numbered BSS-1 and the physical and chemical properties thereof are listed in Table 1.

Example 7

200 g zeolite BS-1 is taken and contacted with an aqueous solution of ammonium hexafluorosilicate with a concentration of 43 g ammonium hexafluorosilicate/100 mL solution at 95° C. for 2 h, in which the liquid-solid volume ratio is 8:1. After that, the slurry is filtered to obtain filter cake, and then the filter cake is washed with deionized water at 75° C. for 40 min, in which the liquid-solid volume ratio is 10:1. When the pH value of the washing liquid approximates to 7, the washing ends. The filter cake is dried in an oven at 120° C. for 5 h to obtain β zeolite of the present invention which is numbered BSS-2 and the physical and chemical properties thereof are listed in Table 1.

Example 8

200 g zeolite BS-2 is taken and contacted with an aqueous solution of ammonium hexafluorosilicate with a concentration of 23.5 g ammonium hexafluorosilicate/100 mL solution at 95° C. for 2 h, in which the liquid-solid volume ratio is 10:1. After that, the slurry is filtered to obtain filter cake, and then the filter cake is washed with deionized water at 75° C. for 40 min, in which the liquid-solid volume ratio is 10:1. When the pH value of the washing liquid approximates to 7, the washing ends. The filter cake is dried in an oven at 120°

C. for 5 h to obtain β zeolite of the present invention which is numbered BSS-3 and the physical and chemical properties thereof are listed in Table 1.

Example 9

200 g zeolite BS-2 is taken and contacted with an aqueous solution of ammonium hexafluorosilicate with a concentration of 51.3 g ammonium hexafluorosilicate/100 mL solution at 75° C. for 1 h, in which the liquid-solid volume ratio is 6:1. After that, the slurry is filtered to obtain filter cake, and then the filter cake is washed with deionized water at 75° C. for 40 min, in which the liquid-solid volume ratio is 10:1. When the pH value of the washing liquid approximates to 7, the washing ends. The filter cake is dried in an oven at 120° C. for 5 h to obtain β zeolite of the present invention which is numbered BSS-4 and the physical and chemical properties thereof are listed in Table 1.

Example 10

200 g zeolite BS-3 is taken and contacted with an aqueous solution of ammonium hexafluorosilicate with a concentration of 27.8 g ammonium hexafluorosilicate/100 mL solution at 95° C. for 3 h, in which the liquid-solid volume ratio is 8:1. After that, the slurry is filtered to obtain filter cake, and then the filter cake is washed with deionized water at 75° C. for 40 min, in which the liquid-solid volume ratio is 10:1. When the pH value of the washing liquid approximates to 7, the washing ends. The filter cake is dried in an oven at 120° C. for 5 h to obtain β zeolite of the present invention which is numbered BSS-5 and the physical and chemical properties thereof are listed in Table 1.

Example 11

200 g zeolite BS-3 is taken and contacted with an aqueous solution of ammonium hexafluorosilicate with a concentration of 56.7 g ammonium hexafluorosilicate/100 mL solution at 95° C. for 2 h, in which the liquid-solid volume ratio is 4:1. After that, the slurry is filtered to obtain filter cake, and then the filter cake is washed with deionized water at 75° C. for 40 min, in which the liquid-solid volume ratio is 10:1. When the pH value of the washing liquid approximates to 7, the washing ends. The filter cake is dried in an oven at 120° C. for 5 h to obtain β zeolite of the present invention which is numbered BSS-6 and the physical and chemical properties thereof are listed in Table 1.

Example 12

200 g zeolite BS-4 is taken and contacted with an aqueous solution of ammonium hexafluorosilicate with a concentration of 33.5 g ammonium hexafluorosilicate/100 mL solution at 75° C. for 3 h, in which the liquid-solid volume ratio is 4:1. After that, the slurry is filtered to obtain filter cake, and then the filter cake is washed with deionized water at 75° C. for 40 min, in which the liquid-solid volume ratio is 10:1. When the pH value of the washing liquid approximates to 7, the washing ends. The filter cake is dried in an oven at 120° C. for 5 h to obtain β zeolite of the present invention which is numbered BSS-7 and the physical and chemical properties thereof are listed in Table 1.

Example 13

200 g zeolite BS-5 is taken and contacted with an aqueous solution of ammonium hexafluorosilicate with a concentration of 45.8 g ammonium hexafluorosilicate/100 mL solution at 95° C. for 2 h, in which the liquid-solid volume ratio is 12:1. After that, the slurry is filtered to obtain filter cake, and then the filter cake is washed with deionized water at 75° C. for 40 min, in which the liquid-solid volume ratio is 10:1. When the pH value of the washing liquid approximates to 7, the washing ends. The filter cake is dried in an oven at 120° C. for 5 h to obtain β zeolite of the present invention which is numbered BSS-8 and the physical and chemical properties thereof are listed in Table 1.

Comparative Example 1

The modified β zeolite is prepared by using the method disclosed in CN1393522A. The β zeolite is numbered BD-1 and the physical and chemical properties thereof are listed in Table 1. The specific preparation process is as follows:

400 g β zeolite raw material powder in Example 1 is taken and exchanged with 2.0 M ammonium nitrate solution with a liquid-solid volume ratio of 10:1, heated to 90-95° C., stirred at a constant temperature for 2 h, and then cooled to 50-60° C. and filtered. The second exchanging is performed to the wet filtering cake in the same condition as the first exchanging. The β zeolite having been subjected to twice ammonium salt exchanging is washed till the pH reaches 5-6, and then put in a drying oven for drying at 110-120° C. for 6 h. The dried β zeolite is put in a muffle furnace to heat rapidly to 250° C. and kept for 2 h, and then further heated rapidly to 400° C., and kept for 4 h, and finally heated to 540° C. and kept for 10 h to obtain β zeolite BD-0 which is subjected to calcination at a high temperature to remove ammonium. 400 g β zeolite BD-0, which is subjected to calcination at a high temperature to remove ammonium and prepared by the above mentioned method, is weighed and crushed and then added to 4000 mL 0.4 M HCl, stirred and heated to 90° C., stirred at a constant temperature for 2 h, cooled, filtered and washed. The β zeolite, which is treated with an acid, is filtered and washed, and then dried at 110-120° C. for 6 h (with a dry basis >80 wt %). The above mentioned dry sample is uniformly sprayed with a certain amount of deionized water, put in a sealed hydrothermal treating furnace, and heated to 650° C. The pressure is controlled at 450 kPa. The sample is calcined at a constant temperature and a constant pressure for 2.5 h, and then naturally cooled to room temperature to obtain β zeolite BD-1.

Figure 2:
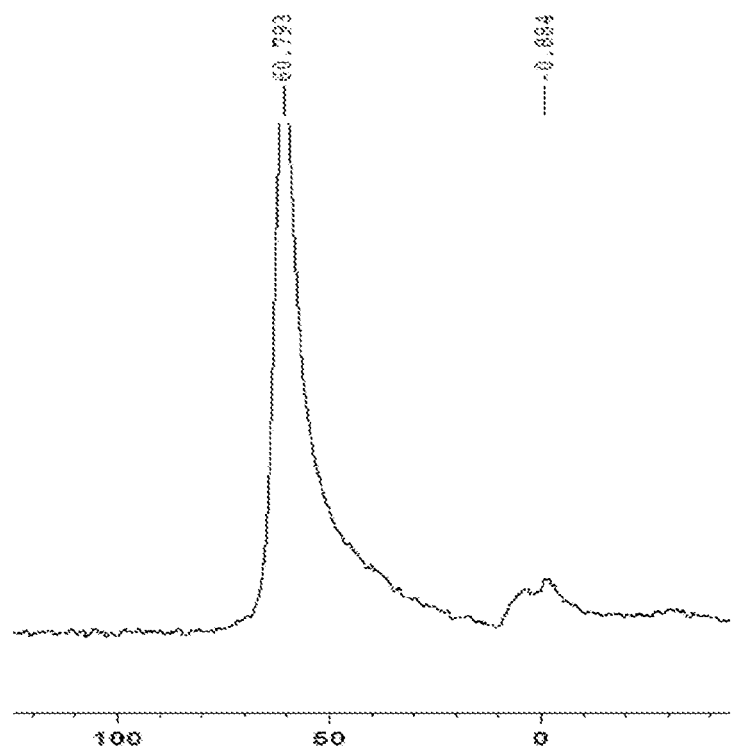
FIG. 2 is $^{27}Al$ MAS NMR spectrogram of the comparative zeolite in Comparative Example 1, wherein the horizontal coordinate is ppm.

The β zeolite BSS-1 made in Example 6 of the present invention and the β zeolite BD-1 made in Comparative Example 1 of the present invention are characterized by solid phase NMR of 500 MHz, and the respective $^{27}$Al MAS NMR spectrogram are respectively shown in FIG. 1 and FIG. 2. In FIG. 1 and FIG. 2, the peak adjacent to 0 ppm corresponds to the six-coordinated non-skeleton aluminum, while the peak adjacent to 60 ppm corresponds to four-coordinated skeleton aluminum, and the peak area can be taken as the proportion of the two aluminum structures. From FIG. 1, it can be seen that in the aluminum spectrum of zeolite of the present invention, there is almost no six-coordinated non-skeleton aluminum, the peak intensity of the four-coordinated skeleton aluminum is stronger, and the half-peak breadth is narrower, which shows that the aluminum structure in the zeolite is basically the four-coordinated aluminum structure of the skeleton; the zeolite of FIG. 2 has a large amount of six-coordinated non-skeleton aluminum structure, and the amount is almost not less than 20% of the aluminum content in the zeolite.

Comparative Example 2

The β zeolite is prepared by using the method in CN1166560C, i.e., first performing ammonium exchanging to the β zeolite and then removing the template. The process specifically is as follows:
(1) 2000 mL slurry containing 400 g solid phase (based on dry basis) after crystallizing in the process of industrially synthesizing Naβ zeolite having $SiO_2/Al_2O_3$ molar ratio of 25.67, and a $Na_2O$ content of 3.75 wt % are taken and diluted with deionized water to a solid-liquid volume ratio of 1:10; ammonium nitrate is added till the ammonium nitrate content in the slurry reaches 2.0 M, stirred, heated to 95° C., stirred at a constant temperature for 2 h, then cooled to 60° C., and filtered; and the second exchanging is performed to the wet filtering cake in the same condition as the first exchanging;
(2) the β zeolite being subjected to twice ammonium salt exchanging is washed till the pH reaches 6, then put in a drying oven and dried at 110° C. for 6 h;
(3) the dried β zeolite is put in a muffle furnace, heated to 250° C. within 1 h and keeping for 2 h, then further heated to 400° C. within 1 h, and kept for 4 h, finally heated to 540° C. and kept for 10 h, and all the material is calcined white, wherein the carbon residue ≤0.2%;
(4) 200 g zeolite is taken, an aqueous solution of ammonium hexafluorosilicate with a concentration of 23.5 g ammonium hexafluorosilicate/100 mL solution is used, in which the liquid-solid volume ratio is 10:1, the treating temperature is 95° C., the treating time is 2 h; after that, the slurry is filtered to obtain filter cake, and then the filter cake is washed at 75° C. for 40 min, in which the liquid-solid volume ratio is 10:1; when the pH value of the washing liquid approximates to 7, the washing ends. The filter cake is dried in an oven at 120° C. for 5 h to obtain β zeolite which is numbered BD-2 and the physical and chemical properties thereof are listed in Table 1.

Comparative Example 3

The same β zeolite raw material powder as Example 1 is taken. 1000 g the above mentioned β zeolite raw powder is taken and put in a sealed hydrothermal treating furnace and treated at a hydrothermal treating temperature of 600° C. and a hydrothermal treating pressure of 0.2 MPa for 3 h using a temperature programming method (with a heating rate of 100° C./h), and subjected to an acid treatment by taking the hydrothermal treated zeolite as the raw material and the treatment conditions comprises: 200 g hydrothermal treated zeolite is taken and treated with hydrochloric acid solution with a concentration of 0.4 mol/L, in which the liquid-solid volume ratio is 10:1, the treating temperature is 95° C., and the treating time is 2 h; after that, the slurry is filtered to obtain filter cake, the filter cake is washed at 75° C. for 40 min, in which the liquid-solid volume ratio is 10:1; when the pH value of the washing liquid approaches to 7, the washing ends. The filter cake is dried in an oven at 120° C. for 5 h to obtain β zeolite which is numbered BD-3 and the physical and chemical properties thereof are listed in Table 1.

Comparative Example 4

The β zeolite is prepared by the method of Example 6, except that the zeolite BS-1 is replaced with the zeolite BDS-4 prepared by using the following method, so as to obtain β zeolite which is numbered BD-4 and the physical and chemical properties thereof are listed in Table 1.

The preparation of the zeolite BDS-4 uses the same β zeolite raw powder as Example 1. 1000 g the above mentioned β zeolite raw powder is taken, put in a sealed hydrothermal treating furnace and treated at a hydrothermal treating temperature of 550° C. and a hydrothermal treating pressure of 0.2 MPa for 6 h using a temperature programming method (with a heating rate of 100° C./h). The sample is numbered BDS-4.

Comparative Example 5

The zeolite BS-1 is subjected to gas phase process of supplementing silicon with aluminum. A sealed container is filled with 200 g zeolite BS-1, and filled with gasified silicon tetrachloride. The reaction temperature is 95° C., the reaction time is 2 h, and the amount of silicon tetrachloride is 9.8 g $SiCl_4$/100 g zeolite. The sample is numbered BD-5 and the physical and chemical properties thereof are listed in Table 1.

Comparative Example 6

The zeolite is prepared by using the method of Example 6, except that the ammonium hexafluorosilicate is replaced by the same amount (in mole) of tetraethoxysilane. The sample is numbered BD-6 and the physical and chemical properties thereof are listed in Table 1.

Comparative Example 7

The β zeolite is prepared by using the method of Example 6, except that the β zeolite raw powder is replaced by the same weight of β zeolite BD-0 which is subjected to calcination at a high temperature to remove ammonium prepared by Comparative Example 1 to obtain β zeolite, which is numbered BD-7 and the physical and chemical properties thereof are listed in Table 1.

TABLE 1 physical and chemical properties of the β zeolite

| | Example No. | | | | | | | |
|---|---|---|---|---|---|---|---|---|
| | 6 | 7 | 8 | 9 | 10 | 11 | 12 | 13 |
| Zeolite No. | BSS-1 | BSS-2 | BSS-3 | BSS-4 | BSS-5 | BSS-6 | BSS-7 | BSS-8 |
| Silicon-aluminum molar ratio | 36.5 | 85.6 | 58.4 | 78.7 | 89.6 | 118.7 | 63.8 | 88.6 |
| BET surface area, m²/g | 634 | 645 | 597 | 603 | 576 | 589 | 612 | 648 |
| Pore volume, mL/g | 0.44 | 0.47 | 0.46 | 0.47 | 0.48 | 0.49 | 0.46 | 0.48 |
| Relative crystallinity, % | 110 | 118 | 120 | 121 | 125 | 130 | 119 | 117 |
| IR acidity, mmol/g | 0.27 | 0.23 | 0.24 | 0.22 | 0.19 | 0.16 | 0.25 | 0.22 |

TABLE 1-continued

| physical and chemical properties of the β zeolite | | | | | | | | |
|---|---|---|---|---|---|---|---|---|
| Silicon in Si(0Al) and skeleton silicon, % | 96.2 | 97.1 | 96.7 | 96.5 | 97.8 | 98.2 | 97.0 | 97.3 |
| Non-skeleton aluminum based on the total aluminum, % | 1.5 | 0.6 | 1.0 | 0.9 | 0.5 | 0.4 | 0.9 | 0.6 |
| Acid amount of medium strong acid based on the total acid amount, % | 87.5 | 89.7 | 88.6 | 89.6 | 91.6 | 93.5 | 88.9 | 90.0 |
| $Na_2O$, wt % | 0.08 | 0.05 | 0.06 | 0.04 | 0.03 | 0.03 | 0.05 | 0.04 |
| Yield of zeolite, wt % | 88.6 | 87.5 | 89.6 | 86.9 | 88.3 | 86.4 | 88.7 | 87.2 |

| | Comparative Example No. | | | | | | |
|---|---|---|---|---|---|---|---|
| | 1 | 2 | 3 | 4 | 5 | 6 | 7 |
| Zeolite No. | BD-1 | BD-2 | BD-3 | BD-4 | BD-5 | BD-6 | BD-7 |
| Silicon-aluminum molar ratio | 59.6 | 62.1 | 35.6 | 37.2 | 33.1 | 28.6 | 25.9 |
| BET surface area, $m^2/g$ | 550 | 563 | 564 | 559 | 478 | 562 | 513 |
| Pore volume, mL/g | 0.37 | 0.38 | 0.39 | 0.37 | 0.36 | 0.33 | 0.31 |
| Relative crystallinity, % | 97 | — | 98 | 96 | 92 | 95 | 96 |
| IR acidity, mmol/g | 0.21 | 0.38 | 0.27 | 0.29 | 0.45 | 0.86 | 0.72 |
| Silicon in Si(0Al) based on skeleton silicon, % | 65.9 | 73.9 | 76.9 | 77.6 | 33.5 | 59.6 | 78.5 |
| Non-skeleton aluminum based on the total aluminum, % | 6.5 | 3.8 | 2.6 | 2.4 | 15.3 | 19.6 | 2.9 |
| Acid amount of medium strong acid based on the total acid amount, % | 76.5 | 79.9 | 82.6 | 75.6 | 33.6 | 24.9 | 77.8 |
| $Na_2O$, wt % | 0.04 | 0.06 | 0.17 | 0.10 | 2.39 | 1.85 | 0.09 |
| Yield of zeolite, wt % | 63.2 | 73.5 | 85.6 | 86.7 | 98.8 | 86.5 | 85.4 |

Example I-1

15.6 g zeolite BSS-1 (with a dry basis of 90 wt %), 114.3 g amorphous silica-alumina (with a $SiO_2$ content of 20 wt %, a pore volume of 0.85 mL/g, a BET surface area of 370 $m^2/g$ and a dry basis of 70 wt %), 94.3 g macroporous alumina (with a pore volume of 1.0 mL/g, a BET surface area of 400 $m^2/g$ and a dry basis of 70 wt %), and 133.3 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier ZS-1. The properties are shown in Table 2.

The carrier is immersed in an impregnation liquid containing tungsten and nickel at room temperature for 2 h, dried at 120° C. for 4 h, calcined at 500° C. for 4 h using temperature programming to obtain the catalyst HC-1. The properties of the carrier and the corresponding catalyst are shown in Table 2.

Example I-2

33.3 g zeolite BSS-1 (with a dry basis of 90 wt %), 85.7 g amorphous silica-alumina (with a $SiO_2$ content of 20 wt %, a pore volume of 0.85 mL/g, a BET surface area of 370 $m^2/g$ and a dry basis of 70 wt %), 100.0 g macroporous alumina (with a pore volume of 1.0 mL/g, a BET surface area of 400 $m^2/g$ and a dry basis of 70 wt %), and 133.3 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier ZS-2. The properties are shown in Table 2.

The carrier is immersed in an impregnation liquid containing tungsten and nickel at room temperature for 2 h, dried at 120° C. for 4 h, calcined at 500° C. for 4 h using temperature programming to obtain the catalyst HC-2. The properties of the carrier and the corresponding catalyst are shown in Table 2.

Example I-3

22.2 g zeolite BSS-5 (with a dry basis of 90 wt %), 71.4 g amorphous silica-alumina (with a $SiO_2$ content of 20 wt %, a pore volume of 0.85 mL/g, a BET surface area of 370 $m^2/g$ and a dry basis of 70 wt %), 128.6 g macroporous alumina (with a pore volume of 1.0 mL/g, a BET surface area of 400 $m^2/g$ and a dry basis of 70 wt %), and 133.3 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier ZS-3. The properties are shown in Table 2.

The carrier is immersed in an impregnation liquid containing tungsten and nickel at room temperature for 2 h, dried at 120° C. for 4 h, calcined at 500° C. for 4 h using temperature programming to obtain the catalyst HC-3. The properties of the carrier and the corresponding catalyst are shown in Table 2.

Example I-4

44.4 g zeolite BSS-5 (with a dry basis of 90 wt %), 142.9 g amorphous silica-alumina (with a $SiO_2$ content of 20 wt %, a pore volume of 0.85 mL/g, a BET surface area of 370 $m^2/g$ and a dry basis of 70 wt %), 28.6 g macroporous alumina (with a pore volume of 1.0 mL/g, a BET surface area of 400 $m^2/g$ and a dry basis of 70 wt %), 28.6 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier ZS-4. The properties are shown in Table 2.

The carrier is immersed in an impregnation liquid containing tungsten and nickel at room temperature for 2 h, dried at 120° C. for 4 h, calcined at 500° C. for 4 h using temperature programming to obtain the catalyst HC-4. The properties of the carrier and the corresponding catalyst are shown in Table 2.

Example I-5

33.3 g zeolite BSS-2 (with a dry basis of 90 wt %), 385.5 g amorphous silica-alumina (with a SiO$_2$ content of 20 wt %, a pore volume of 0.75 mL/g, a BET surface area of 350 m$^2$/g and a dry basis of 70 wt %), 256.9 g macroporous alumina (with a pore volume of 1.0 mL/g, a BET surface area of 400 m$^2$/g and a dry basis of 70 wt %), and 399.6 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier ZS-5. The properties are shown in Table 2.

The carrier is immersed in an impregnation liquid containing tungsten and nickel at room temperature for 2 h, dried at 120° C. for 4 h, calcined at 500° C. for 4 h using temperature programming to obtain the catalyst HC-5. The properties of the carrier and the corresponding catalyst are shown in Table 2.

Example I-6

33.3 g zeolite BSS-3 (with a dry basis of 90 wt %), 171.3 g amorphous silica-alumina (with a SiO$_2$ content of 20 wt %, a pore volume of 0.85 mL/g, a BET surface area of 370 m$^2$/g and a dry basis of 70 wt %), 128.4 g macroporous alumina (with a pore volume of 1.0 mL/g, a BET surface area of 400 m$^2$/g and a dry basis of 70 wt %), and 199.8 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier ZS-6. The properties are shown in Table 2.

The carrier is immersed in an impregnation liquid containing tungsten and nickel at room temperature for 2 h, dried at 120° C. for 4 h, calcined at 500° C. for 4 h using temperature programming to obtain the catalyst HC-6. The properties of the carrier and the corresponding catalyst are shown in Table 2.

Example I-7

33.3 g zeolite BSS-7 (with a dry basis of 90 wt %), 142.7 g amorphous silica-alumina (with a SiO$_2$ content of 20 wt %, a pore volume of 0.85 mL/g, a BET surface area of 370 m$^2$/g and a dry basis of 70 wt %), 42.8 g macroporous alumina (with a pore volume of 1.0 mL/g, a BET surface area of 400 m$^2$/g and a dry basis of 70 wt %), and 133.2 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier ZS-7. The properties are shown in Table 2.

The carrier is immersed in an impregnation liquid containing tungsten and nickel at room temperature for 2 h, dried at 120° C. for 4 h, calcined at 500° C. for 4 h using temperature programming to obtain the catalyst HC-7. The properties of the carrier and the corresponding catalyst are shown in Table 2.

Example I-8

33.3 g zeolite BSS-8 (with a dry basis of 90 wt %), 122.3 g amorphous silica-alumina (with a SiO$_2$ content of 20 wt %, a pore volume of 0.85 mL/g, a BET surface area of 370 m$^2$/g and a dry basis of 70 wt %), 324.1 g macroporous alumina (with a pore volume of 1.0 mL/g, a BET surface area of 400 m$^2$/g and a dry basis of 70 wt %), and 285.3 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier ZS-8. The properties are shown in Table 2.

The carrier is immersed in an impregnation liquid containing tungsten and nickel at room temperature for 2 h, dried at 120° C. for 4 h, calcined at 500° C. for 4 h using temperature programming to obtain the catalyst HC-8. The properties of the carrier and the corresponding catalyst are shown in Table 2.

Comparative Example I-1

The carrier is prepared by using the method of Example I-2, except that the zeolite BSS-1 is replaced by the same weight of β zeolite BD-2, the obtained carrier is numbered ZDS-1. The properties are shown in Table 2.

The catalyst is prepared by the method of Example I-2 using the above mentioned carrier, the obtained catalyst is numbered HCD-1. The properties of the carrier and the corresponding catalyst are shown in Table 2.

Comparative Example I-2

The carrier is prepared by using the method of Example I-3, except that the zeolite BSS-5 is replaced by the same weight of β zeolite BD-3, the obtained carrier is numbered ZDS-2. The properties are shown in Table 2.

The catalyst is prepared by the method of Example I-3 using the above mentioned carrier, the obtained catalyst is numbered HCD-2. The properties of the carrier and the corresponding catalyst are shown in Table 2.

Comparative Example I-3

The carrier is prepared by using the method of Example I-4, except that the zeolite BSS-5 is replaced by the same weight of β zeolite BD-1, the obtained carrier is numbered ZDS-3. The properties are shown in Table 2.

The catalyst is prepared by the method of Example I-4 using the above mentioned carrier, the obtained catalyst is numbered HCD-3. The properties of the carrier and the corresponding catalyst are shown in Table 2.

Comparative Example I-4

The carrier is prepared by using the method of Example I-2, except that the zeolite BSS-1 is replaced by the same weight of β zeolite BD-4, the obtained carrier is numbered ZDS-4. The properties are shown in Table 2.

The catalyst is prepared by the method of Example I-2 using the above mentioned carrier, the obtained catalyst is numbered HCD-4. The properties of the carrier and the corresponding catalyst are shown in Table 2.

Comparative Example I-5

The carrier is prepared by using the method of Example I-2, except that the zeolite BSS-1 is replaced by the same weight of β zeolite BD-5, the obtained carrier is numbered ZDS-5. The properties are shown in Table 2.

The catalyst is prepared by the method of Example I-2 using the above mentioned carrier, the obtained catalyst is numbered HCD-5. The properties of the carrier and the corresponding catalyst are shown in Table 2.

Comparative Example I-6

The carrier is prepared by using the method of Example I-2, except that the zeolite BSS-1 is replaced by the same weight of β zeolite BD-6, the obtained carrier is numbered ZDS-6. The properties are shown in Table 2.

The catalyst is prepared by the method of Example I-2 using the above mentioned carrier, the obtained catalyst is numbered HCD-6. The properties of the carrier and the corresponding catalyst are shown in Table 2.

Comparative Example I-7

The carrier is prepared by using the method of Example I-2, except that the zeolite BSS-1 is replaced by the same weight of β zeolite BD-7, the obtained carrier is numbered ZDS-7. The properties are shown in Table 2.

The catalyst is prepared by the method of Example I-2 using the above mentioned carrier, the obtained catalyst is numbered HCD-7. The properties of the carrier and the corresponding catalyst are shown in Table 2.

TABLE 2 physical and chemical properties of the catalyst carriers and the catalysts

| | Example No. | | | | | | | |
|---|---|---|---|---|---|---|---|---|
| | I-1 | I-2 | I-3 | I-4 | I-5 | I-6 | I-7 | I-8 |
| Carrier | | | | | | | | |
| No. | ZS-1 | ZS-2 | ZS-3 | ZS-4 | ZS-5 | ZS-6 | ZS-7 | ZS-8 |
| β zeolite, wt % | 7 | 15 | 10 | 20 | 5 | 10 | 15 | 7 |
| Amorphous silicon aluminum, wt % | 40 | 30 | 25 | 50 | 45 | 40 | 50 | 20 |
| Alumina | | | | balance | | | | |
| Pore volume, mL/g | 0.74 | 0.73 | 0.75 | 0.68 | 0.76 | 0.72 | 0.67 | 0.78 |
| BET surface area, m$^2$/g | 415 | 440 | 431 | 456 | 428 | 430 | 416 | 443 |
| Catalyst | | | | | | | | |
| No. | HC-1 | HC-2 | HC-3 | HC-4 | HC-5 | HC-6 | HC-7 | HC-8 |
| WO$_3$, wt % | 17.5 | 21.5 | 22.9 | 27.6 | 21.6 | 23.5 | 21.8 | 27.0 |
| NiO, wt % | 4.3 | 5.3 | 5.6 | 7.5 | 5.4 | 5.5 | 5.4 | 6.7 |
| Pore volume, mL/g | 0.58 | 0.55 | 0.52 | 0.44 | 0.53 | 0.51 | 0.38 | 0.49 |
| BET surface area, m$^2$/g | 329 | 334 | 308 | 299 | 311 | 315 | 301 | 300 |

| | Comparative Example No. | | | | | | |
|---|---|---|---|---|---|---|---|
| | I-1 | I-2 | I-3 | I-4 | I-5 | I-6 | I-7 |
| Carrier | | | | | | | |
| No. | ZDS-1 | ZDS-2 | ZDS-3 | ZDS-4 | ZDS-5 | ZDS-6 | ZDS-7 |
| β zeolite, wt % | 15 | 10 | 20 | 15 | 15 | 15 | 15 |
| Amorphous silicon aluminum, wt % | 30 | 25 | 50 | 30 | 30 | 30 | 30 |
| Alumina | | | | balance | | | |
| Pore volume, mL/g | 0.68 | 0.70 | 0.57 | 0.59 | 0.65 | 0.65 | 0.61 |
| BET surface area, m$^2$/g | 401 | 369 | 336 | 358 | 347 | 409 | 388 |
| Catalyst | | | | | | | |
| No. | HCD-1 | HCD-2 | HCD-3 | HCD-4 | HCD-5 | HCD-6 | HCD-7 |
| WO$_3$, wt % | 21.8 | 23.8 | 27.5 | 21.4 | 21.6 | 21.6 | 21.5 |
| NiO, wt % | 5.5 | 6.1 | 7.4 | 5.4 | 5.5 | 5.2 | 5.3 |
| Pore volume, mL/g | 0.50 | 0.49 | 0.32 | 0.33 | 0.41 | 0.36 | 0.34 |
| BET surface area, m$^2$/g | 301 | 263 | 241 | 256 | 251 | 278 | 254 |

Catalytic Performance Evaluation 1

The catalyst is evaluated on a fixed bed hydrogenation test device. The evaluation conditions comprise the following: a total reaction pressure of 15.01 MPa, a hydrogen-oil volume ratio of 1500, and a LHSV of 0.9 h$^{-1}$. VGO is taken as the raw oil. The properties of the VGO are listed in Table 3. The catalysts HC-1 to HC-8 and HCD-1 to HCD-7 are evaluated in the same process conditions. The obtained evaluation results are listed in Table 4.

TABLE 3 properties of raw oil

| Raw oil | VGO-1 | VGO-2 |
|---|---|---|
| Density (20° C.), g/cm$^3$ | 0.9054 | 0.9118 |
| Boiling Point/° C. | | |
| IBP/10% | 303/362 | 316/385 |
| 30%/50% | 393/415 | 417/443 |
| 70%/90% | 445/485 | 475/520 |
| 95%/EBP | 510/554 | 543/553 |
| Solidification Point/° C. | 35 | 33 |
| S, wt % | 2.08 | 1.76 |
| N, μg/g | 1180 | 1236 |
| C, wt % | 85.28 | 85.35 |
| H, wt % | 12.52 | 12.77 |
| BMCI | 44.06 | 44.40 |

TABLE 4 performance evaluation conditions and results

| Catalyst | HC-2 | HC-1 | HC-3 | HC-4 | HC-5 | HC-6 | HC-7 | HC-8 |
|---|---|---|---|---|---|---|---|---|
| Raw oil | VGO-1 | VGO-1 | VGO-1 | VGO-1 | VGO-1 | VGO-1 | VGO-2 | VGO-2 |
| LHSV, h$^{-1}$ | 0.9 | 0.9 | 0.9 | 0.9 | 0.9 | 0.9 | 0.9 | 0.9 |
| Total reaction pressure, MPa | 15.0 | 15.0 | 15.0 | 15.0 | 15.0 | 15.0 | 15.0 | 15.0 |
| Hydrogen-oil volume ratio | 1500 | 1500 | 1500 | 1500 | 1500 | 1500 | 1500 | 1500 |
| Reaction temperature, ° C. | 385 | 378 | 380 | 375 | 386 | 381 | 377 | 385 |
| Product yield and properties | | | | | | | | |
| Heavy naphtha | | | | | | | | |
| Yield, wt % | 4.5 | 4.1 | 4.8 | 3.8 | 4.3 | 4.6 | 3.9 | 4.6 |
| Aromatics potential, wt % | 58.6 | 57.6 | 56.9 | 55.6 | 58.2 | 56.2 | 59.6 | 57.6 |
| Jet fuel | | | | | | | | |
| Yield, wt % | 18.8 | 19.6 | 18.6 | 17.9 | 18.9 | 21.0 | 17.3 | 18.5 |
| Smoke point, mm | 26 | 25 | 26 | 25 | 27 | 26 | 26 | 27 |
| Aromatics, v % | 7.2 | 7.5 | 7.2 | 8.4 | 7.1 | 6.8 | 7.2 | 6.4 |
| Diesel oil | | | | | | | | |
| Yield, wt % | 48.2 | 47.6 | 47.9 | 47.6 | 49.6 | 46.5 | 48.6 | 47.5 |
| Solidification Point, ° C. | −18 | −20 | −19 | −17 | −20 | −22 | −19 | −21 |
| Cetane number | 50.6 | 51.2 | 50.9 | 50.0 | 52.3 | 53.0 | 51.6 | 54.6 |
| Tail oil | | | | | | | | |
| Yield, wt % | 25.7 | 26.1 | 26.3 | 28.5 | 24.4 | 25.4 | 27.8 | 25.1 |
| Solidification Point, ° C. | 13 | 12 | 14 | 15 | 12 | 14 | 14 | 11 |
| BMCI | 13.5 | 14.2 | 13.8 | 14.6 | 13.2 | 12.1 | 12.0 | 12.5 |
| Chemical H$_2$ consumption, wt % | 2.06 | 2.04 | 2.05 | 1.98 | 2.09 | 2.10 | 2.01 | 2.02 |

| Catalyst | HCD-1 | HCD-2 | HCD-3 | HCD-4 | HCD-5 | HCD-6 | HCD-7 |
|---|---|---|---|---|---|---|---|
| Raw oil | VGO-1 | VGO-1 | VGO-1 | VGO-1 | VGO-1 | VGO-1 | VGO-1 |
| LHSV, h$^{-1}$ | 0.9 | 0.9 | 0.9 | 0.9 | 0.9 | 0.9 | 0.9 |
| Total reaction pressure/MPa | 15.0 | 15.0 | 15.0 | 15.0 | 15.0 | 15.0 | 15.0 |
| Hydrogen-oil volume ratio | 1500 | 1500 | 1500 | 1500 | 1500 | 1500 | 1500 |
| Reaction temperature/° C. | 392 | 395 | 403 | 398 | 407 | 412 | 395 |
| Product yield and properties | | | | | | | |
| Heavy naphtha | | | | | | | |
| Yield, wt % | 5.9 | 6.3 | 7.8 | 6.8 | 8.8 | 7.7 | 6.1 |
| Aromatics potential, wt % | 51.5 | 50.6 | 48.2 | 49.6 | 43.6 | 46.3 | 50.4 |
| Jet fuel | | | | | | | |
| Yield, wt % | 20.6 | 21.1 | 20.5 | 18.6 | 22.6 | 21.3 | 20.5 |
| Smoke point, mm | 24 | 23 | 25 | 22 | 24 | 21 | 22 |
| Aromatics, v % | 8.9 | 9.6 | 9.6 | 10.2 | 9.6 | 12.6 | 9.8 |
| Diesel oil | | | | | | | |
| Yield, wt % | 43.8 | 42.1 | 40.2 | 39.6 | 37.5 | 38.4 | 42.9 |
| Solidification Point, ° C. | −8 | −6 | −7 | −5 | −8 | −5 | −5 |
| Cetane number | 47.8 | 47.3 | 46.5 | 45.6 | 44.36 | 47.6 | 46.5 |

TABLE 4-continued

| performance evaluation conditions and results | | | | | | | |
|---|---|---|---|---|---|---|---|
| Tail oil | | | | | | | |
| Yield, wt % | 25.9 | 25.6 | 26.5 | 27.9 | 25.5 | 26.5 | 26.7 |
| Solidification Point, ° C. | 22 | 20 | 25 | 23 | 25 | 21 | 25 |
| BMCI | 15.6 | 14.3 | 17.5 | 16.8 | 18.4 | 16.3 | 15.9 |
| Chemical $H_2$ consumption, wt % | 2.20 | 2.22 | 2.36 | 2.34 | 2.44 | 2.65 | 2.31 |

It can be seen from the evaluation results of Table 4 that the diesel oil selectivity, yield and product quality of the catalysts prepared by the present invention are better than those of the reference catalysts in the same process conditions.

Example II-1

22.22 g zeolite BSS-1 (with a dry basis of 90 wt %), 44.44 g Y zeolite (with $SiO_2/Al_2O_3$ molar ratio of 50, a cell parameter of 2.431 nm, a pore volume of 0.45 mL/g, a BET surface area of 900 $m^2/g$ and a dry basis of 90 wt %), 157.1 g macroporous alumina (with a pore volume of 1.0 mL/g, a BET surface area of 400 $m^2/g$ and a dry basis of 70 wt %), and 100 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier S-1.

The carrier is immersed in an impregnation liquid containing tungsten and nickel at room temperature for 2 h, dried at 120° C. for 4 h, calcined at 500° C. for 4 h using temperature programming to obtain the catalyst FC-1. The properties of the carrier and the corresponding catalyst are shown in Table 5.

Example II-2

33.33 g zeolite BSS-1 (with a dry basis of 90 wt %), 44.44 g Y zeolite (with $SiO_2/Al_2O_3$ molar ratio of 53.5, a cell parameter of 2.432 nm, a pore volume of 0.49 mL/g, a BET surface area of 878 $m^2/g$ and a dry basis of 90 wt %), 142.86 g macroporous alumina (with a pore volume of 1.0 mL/g, a BET surface area of 400 $m^2/g$ and a dry basis of 70 wt %), and 100 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier S-2.

The carrier is immersed in an impregnation liquid containing tungsten and nickel at room temperature for 2 h, dried at 120° C. for 4 h, calcined at 500° C. for 4 h using temperature programming to obtain the catalyst FC-2. The properties of the carrier and the corresponding catalyst are shown in Table 5.

Example II-3

11.11 g zeolite BSS-3 (with a dry basis of 90 wt %), 66.67 g Y zeolite (with $SiO_2/Al_2O_3$ molar ratio of 91, a cell parameter of 2.4329 nm, a pore volume of 0.52 mL/g, a BET surface area of 943 $m^2/g$ and a dry basis of 90 wt %), 142.86 g macroporous alumina (with a pore volume of 1.0 mL/g, a BET surface area of 400 $m^2/g$ and a dry basis of 70 wt %), and 100 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier S-3.

The carrier is immersed in an impregnation liquid containing tungsten and nickel at room temperature for 2 h, dried at 120° C. for 4 h, calcined at 500° C. for 4 h using temperature programming to obtain the catalyst FC-3. The properties of the carrier and the corresponding catalyst are shown in Table 5.

Example II-4

44.44 g zeolite BSS-3 (with a dry basis of 90 wt %), 55.56 g Y zeolite (with $SiO_2/Al_2O_3$ molar ratio of 37, a cell parameter of 2.433 nm, a pore volume of 0.45 mL/g, a BET surface area of 887 $m^2/g$ and a dry basis of 90 wt %), 88.89 g macroporous alumina (with a pore volume of 1.0 mL/g, a BET surface area of 400 $m^2/g$ and a dry basis of 70 wt %), and 100 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier S-4.

The carrier is immersed in an impregnation liquid containing tungsten and nickel at room temperature for 2 h, dried at 120° C. for 4 h, calcined at 500° C. for 4 h using temperature programming to obtain the catalyst FC-4. The properties of the carrier and the corresponding catalyst are shown in Table 5.

Example II-5

22.22 g zeolite BSS-5 (with a dry basis of 90 wt %), 44.3 g Y zeolite (with $SiO_2/Al_2O_3$ molar ratio of 91, a cell parameter of 2.4329 nm, a pore volume of 0.52 mL/g, a BET surface area of 943 $m^2/g$ and a dry basis of 90 wt %), 66.5 g macroporous alumina (with a pore volume of 1.0 mL/g, a BET surface area of 400 $m^2/g$ and a dry basis of 70 wt %), and 88.7 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier S-5.

The carrier is immersed in an impregnation liquid containing tungsten and nickel at room temperature for 2 h, dried at 120° C. for 4 h, calcined at 500° C. for 4 h using temperature programming to obtain the catalyst FC-5. The properties of the carrier and the corresponding catalyst are shown in Table 5.

Example II-6

22.22 g zeolite BSS-7 (with a dry basis of 90 wt %), 155.5 g Y zeolite (with $SiO_2/Al_2O_3$ molar ratio of 91, a cell parameter of 2.4329 nm, a pore volume of 0.52 mL/g, a BET surface area of 943 m$^2$/g and a dry basis of 90 wt %), 177.8 g macroporous alumina (with a pore volume of 1.0 mL/g, a BET surface area of 400 m$^2$/g and a dry basis of 70 wt %), and 266.7 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier S-6.

The carrier is immersed in an impregnation liquid containing tungsten and nickel at room temperature for 2 h, dried at 120° C. for 4 h, calcined at 500° C. for 4 h using temperature programming to obtain the catalyst FC-6. The properties of the carrier and the corresponding catalyst are shown in Table 5.

Example II-7

33.33 g zeolite BSS-8 (with a dry basis of 90 wt %), 33.33 g Y zeolite (with $SiO_2/Al_2O_3$ molar ratio of 37, a cell parameter of 2.433 nm, a pore volume of 0.45 mL/g, a BET surface area of 887 m$^2$/g and a dry basis of 90 wt %), 142.90 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier S-7.

The carrier is immersed in an impregnation liquid containing tungsten and nickel at room temperature for 2 h, dried at 120° C. for 4 h, calcined at 500° C. for 4 h using temperature programming to obtain the catalyst FC-7. The properties of the carrier and the corresponding catalyst are shown in Table 5.

Comparative Example II-1

33.33 g zeolite BD-1 (with a dry basis of 90 wt %), 44.44 g Y zeolite (with $SiO_2/Al_2O_3$ molar ratio of 50, a cell parameter of 2.431 nm, a pore volume of 0.45 mL/g, a BET surface area of 900 m$^2$/g and a dry basis of 90 wt %), 128.6 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier DS-1.

The carrier is immersed in an impregnation liquid containing tungsten and nickel at room temperature for 2 h, dried at 120° C. for 4 h, calcined at 500° C. for 4 h using temperature programming to obtain the catalyst FCD-1. The properties of the carrier and the corresponding catalyst are shown in Table 5.

Comparative Example II-2

11.11 g zeolite BD-1 (with a dry basis of 90 wt %), 66.67 g Y zeolite (with $SiO_2/Al_2O_3$ molar ratio of 53.5, a cell parameter of 2.432 nm, a pore volume of 0.49 mL/g, a BET surface area of 878 m$^2$/g and a dry basis of 90 wt %), 128.6 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier DS-2.

The carrier is immersed in an impregnation liquid containing tungsten and nickel at room temperature for 2 h, dried at 120° C. for 4 h, calcined at 500° C. for 4 h using temperature programming to obtain the catalyst FCD-2. The properties of the carrier and the corresponding catalyst are shown in Table 5.

Comparative Example II-3

33.33 g zeolite BD-3 (with a dry basis of 90 wt %), 44.44 g Y zeolite (with $SiO_2/Al_2O_3$ molar ratio of 91, a cell parameter of 2.4329 nm, a pore volume of 0.52 mL/g, a BET surface area of 943 m$^2$/g and a dry basis of 90 wt %), 128.6 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled into paste, and squeezed into strips, the strips are dried at 110° C. for 4 h, and then calcined at 550° C. for 4 h to obtain the carrier DS-3.

The carrier is immersed in an impregnation liquid containing tungsten and nickel at room temperature for 2 h, dried at 120° C. for 4 h, calcined at 500° C. for 4 h using temperature programming to obtain the catalyst FDC-3. The properties of the carrier and the corresponding catalyst are shown in Table 5.

Comparative Example II-4

The carrier is prepared by using the method of Example II-4, except that the zeolite BSS-3 is replaced by the same weight of β zeolite BD-2, the obtained carrier is numbered DS-4. The properties are shown in Table 5.

The catalyst is prepared by the method of Example II-4 using the above mentioned carrier, the obtained catalyst is numbered FCD-4. The properties of the carrier and the corresponding catalyst are shown in Table 5.

Comparative Example II-5

The carrier is prepared by using the method of Example II-2, except that the zeolite BSS-1 is replaced by the same weight of β zeolite BD-4, the obtained carrier is numbered DS-5. The properties are shown in Table 5.

The catalyst is prepared by the method of Example II-2 using the above mentioned carrier, the obtained catalyst is numbered FDC-5. The properties of the carrier and the corresponding catalyst are shown in Table 5.

Comparative Example II-6

The carrier is prepared by using the method of Example II-2, except that the zeolite BSS-1 is replaced by the same weight of β zeolite BD-5, the obtained carrier is numbered DS-6. The properties are shown in Table 5.

The catalyst is prepared by the method of Example II-2 using the above mentioned carrier, the obtained catalyst is numbered FCD-6. The properties of the carrier and the corresponding catalyst are shown in Table 5.

Comparative Example II-7

The carrier is prepared by using the method of Example II-2, except that the zeolite BSS-1 is replaced by the same weight of β zeolite BD-6, the obtained carrier is numbered DS-7. The properties are shown in Table 5.

The catalyst is prepared by the method of Example II-2 using the above mentioned carrier, the obtained catalyst is numbered FDC-7. The properties of the carrier and the corresponding catalyst are shown in Table 5.

Comparative Example II-8

The carrier is prepared by using the method of Example II-2, except that the zeolite BSS-1 is replaced by the same weight of β zeolite BD-7, the obtained carrier is numbered DS-8. The properties are shown in Table 5.

The catalyst is prepared by the method of Example II-2 using the above mentioned carrier, the obtained catalyst is numbered FDC-8. The properties of the carrier and the corresponding catalyst are shown in Table 5.

TABLE 5 physical and chemical properties of the catalyst carriers and the catalysts

| | Example No. | | | | | | |
|---|---|---|---|---|---|---|---|
| | II-1 | II-2 | II-3 | II-4 | II-5 | II-6 | II-7 |
| Carrier | | | | | | | |
| No. | S-1 | S-2 | S-3 | S-4 | S-5 | S-6 | S-7 |
| β zeolite, wt % | 10 | 15 | 5 | 20 | 15 | 5 | 15 |
| Y zeolite, wt % | 20 | 20 | 30 | 25 | 30 | 35 | 15 |
| Alumina | | | | balance | | | |
| Pore volume, mL/g | 435 | 452 | 463 | 489 | 496 | 486 | 443 |
| BET surface area, m$^2$/g | 0.68 | 0.65 | 0.66 | 0.67 | 0.65 | 0.64 | 0.69 |
| Catalyst | | | | | | | |
| No. | FC-1 | FC-2 | FC-3 | FC-4 | FC-5 | FC-6 | FC-7 |
| WO$_3$, wt % | 22.36 | 21.63 | 22.06 | 22.18 | 24.36 | 26.78 | 22.36 |
| NiO, wt % | 5.4 | 5.5 | 5.3 | 5.5 | 5.9 | 6.3 | 5.2 |
| BET surface area, m$^2$/g | 330 | 327 | 332 | 349 | 365 | 357 | 352 |
| Pore volume, mL/g | 0.47 | 0.46 | 0.45 | 0.48 | 0.45 | 0.47 | 0.49 |

| | Comparative Example No. | | | | | | | |
|---|---|---|---|---|---|---|---|---|
| | II-1 | II-2 | II-3 | II-4 | II-5 | II-6 | II-7 | II-8 |
| Carrier | | | | | | | | |
| No. | DS-1 | DS-2 | DS-3 | DS-4 | DS-5 | DS-6 | DS-7 | DS-8 |
| β zeolite, wt % | 15 | 5 | 15 | 20 | 15 | 15 | 15 | 15 |
| Y zeolite, wt % | 20 | 30 | 20 | 25 | 20 | 20 | 20 | 20 |
| Alumina | | | | balance | | | | |
| Pore volume, mL/g | 0.65 | 0.57 | 0.58 | 0.54 | 0.61 | 0.54 | 0.51 | 0.57 |
| BET surface area, m$^2$/g | 415 | 424 | 301 | 399 | 356 | 332 | 306 | 396 |
| Catalyst | | | | | | | | |
| No. | FCD-1 | FCD-2 | FCD-3 | FCD-4 | FCD-5 | FCD-6 | FCD-7 | FCD-8 |
| WO$_3$, wt % | 22.23 | 21.88 | 21.85 | 21.56 | 21.95 | 21.76 | 21.69 | 21.63 |
| NiO, wt % | 5.4 | 5.3 | 5.2 | 5.4 | 5.4 | 5.3 | 5.5 | 5.5 |
| BET surface area, m$^2$/g | 289 | 273 | 233 | 256 | 231 | 216 | 234 | 241 |
| Pore volume, mL/g | 0.42 | 0.37 | 0.36 | 0.32 | 0.34 | 0.29 | 0.31 | 0.32 |

Catalytic Performance Evaluation 2

The catalyst is evaluated on a fixed bed hydrogenation test device. The evaluation comprises the following conditions: a total reaction pressure of 15.01 MPa, a hydrogen-oil volume ratio of 1500, and a volume space velocity of 1.5 h$^{-1}$. VGO is taken as the raw oil. The properties of the raw oil are listed in Table 3. The catalysts FC-1 to FC-7 and FCD-1 to FCD-8 are evaluated in the same process conditions. The obtained evaluation results are listed in Table 6.

TABLE 6 performance evaluation conditions and results

| Catalyst | FC-2 | FC-1 | FC-3 | FC-4 | FC-5 | FC-6 | FC-7 |
|---|---|---|---|---|---|---|---|
| Raw oil | VGO-1 | | | | | VGO-2 | |
| LHSV, h$^{-1}$ | 1.5 | 1.5 | 1.5 | 1.5 | 1.5 | 1.5 | 1.5 |
| Total reaction pressure, MPa | 15.0 | 15.0 | 15.0 | 15.0 | 15.0 | 15.0 | 15.0 |
| Hydrogen-oil volume ratio | 1500 | 1500 | 1500 | 1500 | 1500 | 1500 | 1500 |

TABLE 6-continued

| performance evaluation conditions and results | | | | | | | |
|---|---|---|---|---|---|---|---|
| Reaction temperature, ° C. | 370 | 367 | 365 | 363 | 364 | 366 | 371 |
| Product yield and properties | | | | | | | |
| Heavy naphtha | | | | | | | |
| Yield, wt % | 9.1 | 8.9 | 7.8 | 7.5 | 7.4 | 6.8 | 8.9 |
| Aromatics potential, wt % | 65.8 | 66.8 | 64.3 | 63.6 | 65.0 | 61.2 | 65.9 |
| Jet fuel | | | | | | | |
| Yield, wt % | 47.6 | 47.9 | 46.5 | 46.7 | 47.9 | 49.6 | 47.8 |
| Smoke point, mm | 28 | 27 | 27 | 28 | 29 | 30 | 28 |
| Aromatics, v % | 4.5 | 4.6 | 4.8 | 4.7 | 3.9 | 3.1 | 4.9 |
| Diesel oil | | | | | | | |
| Yield, wt % | 22.8 | 22.9 | 23.8 | 22.8 | 22.6 | 23.5 | 22.7 |
| Solidification Point, ° C. | −18 | −20 | −17 | −19 | −18 | −22 | −19 |
| Cetane number | 68.6 | 69.7 | 67.5 | 69.5 | 70.9 | 77.9 | 69.8 |
| Tail oil | | | | | | | |
| Yield, wt % | 15.9 | 16.1 | 16.5 | 15.3 | 15.8 | 15.3 | 16.1 |
| Solidification Point, ° C. | 12 | 11 | 13 | 12 | 11 | 14 | 12 |
| BMCI | 12.4 | 11.9 | 12.1 | 13.0 | 12.4 | 9.8 | 12.6 |
| Middle distillate oil selectivity, wt % | 83.7 | 84.4 | 84.2 | 82.1 | 83.7 | 86.3 | 84.0 |
| Chemical $H_2$ consumption, wt % | 2.63 | 2.60 | 2.62 | 2.56 | 2.60 | 2.54 | 2.61 |

| | | | | | | | | |
|---|---|---|---|---|---|---|---|---|
| Catalyst | FCD-1 | FCD-2 | FCD-3 | FCD-4 | FCD-5 | FCD-6 | FCD-7 | FCD-8 |
| Raw oil | VGO-1 | VGO-1 | VGO-1 | VGO-2 | VGO-1 | VGO-1 | VGO-1 | VGO-8 |
| LHSV, h$^{-1}$ | 1.5 | 1.5 | 1.5 | 1.5 | 1.5 | 1.5 | 1.5 | 1.5 |
| Total reaction pressure, MPa | 15.0 | 15.0 | 15.0 | 15.0 | 15.0 | 15.0 | 15.0 | 15.0 |
| Hydrogen-oil volume ratio | 1500 | 1500 | 1500 | 1500 | 1500 | 1500 | 1500 | 1500 |
| Reaction temperature, ° C. | 375 | 381 | 379 | 385 | 395 | 392 | 386 | 385 |
| Product yield and properties | | | | | | | | |
| Heavy naphtha | | | | | | | | |
| Yield, wt % | 11.2 | 12.6 | 13.5 | 12.3 | 13.9 | 12.7 | 13.8 | 11.5 |
| Aromatics potential, wt % | 62.3 | 59.8 | 58.6 | 57.3 | 55.3 | 54.3 | 53.2 | 61.3 |
| Jet fuel | | | | | | | | |
| Yield, wt % | 44.9 | 42.0 | 41.0 | 42.0 | 44.5 | 45.3 | 46.2 | 44.2 |
| Smoke point, mm | 26 | 24 | 25 | 23 | 24 | 24 | 25 | 24 |
| Aromatics, v % | 4.8 | 5.6 | 6.6 | 8.9 | 8.4 | 5.2 | 5.1 | 4.8 |
| Diesel oil | | | | | | | | |
| Yield, wt % | 22.5 | 21.6 | 20.9 | 18.6 | 21.5 | 21.6 | 20.9 | 22.7 |
| Solidification Point, ° C. | −6 | −5 | −4 | −7 | −3 | −7 | −6 | −5 |
| Cetane number | 67.3 | 61.7 | 60.3 | 56.9 | 58.9 | 61.5 | 60.9 | 58.6 |
| Tail oil | | | | | | | | |
| Yield, wt % | 15.1 | 16.1 | 15.9 | 17.3 | 16.5 | 16.3 | 15.5 | 16.0 |
| Solidification Point, ° C. | 19 | 20 | 22 | 25 | 26 | 19 | 21 | 22 |
| BMCI | 14.6 | 15.3 | 15.9 | 15.3 | 14.8 | 14.3 | 14.3 | 15.4 |
| Middle distillate oil selectivity, wt % | 80.6 | 77.0 | 73.6 | 73.3 | 79.0 | 77.9 | 79.4 | 79.6 |
| Chemical $H_2$ consumption, wt % | 2.72 | 2.75 | 2.89 | 2.86 | 2.85 | 2.96 | 2.99 | 2.81 |

It can be seen from the evaluation results of Table 6 that the jet fuel and the diesel oil selectivity, yield and product quality of the catalysts prepared by the present invention are better than those of the reference catalysts in the same process conditions.

Example III-1

33.3 g zeolite BSS-2 (with a dry basis of 90 wt %), 200.0 g macroporous alumina (with a pore volume of 1.0 mL/g, a BET surface area of 400 m²/g and a dry basis of 70 wt %), and 133.3 g adhesive (with a dry basis of 30 wt % and a nitric acid/macroporous alumina molar ratio of 0.4) are put in a milling machine for milling, filled with water, milled to paste, and squeezed into strips, the strips are dried at 110° C. for 4 h, and then calcined at 550° C. for 4 h to obtain the carrier CS-1. The properties are shown in Table 7.

The carrier is immersed in an impregnation liquid containing tungsten and nickel at room temperature for 2 h, dried at 120° C. for 4 h, calcined at 500° C. for 4 h using temperature programming to obtain the catalyst LC-1. The properties of the carrier and the corresponding catalyst are shown in Table 7.

Example III-2

44.4 g zeolite BSS-2 (with a dry basis of 90 wt %), 171.4 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled to paste, and squeezed into strips, the strips are dried at 110° C. for 4 h, and then calcined at 550° C. for 4 h to obtain the carrier CS-2. The properties are shown in Table 7.

The carrier is immersed in an impregnation liquid containing tungsten and nickel at room temperature for 2 h, dried at 120° C. for 4 h, calcined at 500° C. for 4 h using temperature programming to obtain the catalyst LC-2. The properties of the carrier and the corresponding catalyst are shown in Table 7.

Example III-3

66.6 g zeolite BSS-6 (with a dry basis of 90 wt %), 142.9 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled to paste, and squeezed into strips, the strips are dried at 110° C. for 4 h, and then calcined at 550° C. for 4 h to obtain the carrier CS-3. The properties are shown in Table 7.

The carrier is immersed in an impregnation liquid containing tungsten and nickel at room temperature for 2 h, dried at 120° C. for 4 h, calcined at 500° C. for 4 h using temperature programming to obtain the catalyst LC-3. The properties of the carrier and the corresponding catalyst are shown in Table 7.

Example III-4

77.8 g zeolite BSS-6 (with a dry basis of 90 wt %), 128.6 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled to paste, and squeezed into strips, the strips are dried at 110° C. for 4 h, and then calcined at 550° C. for 4 h to obtain the carrier CS-4. The properties are shown in Table 7.

The carrier is immersed in an impregnation liquid containing tungsten and nickel at room temperature for 2 h, dried at 120° C. for 4 h, calcined at 500° C. for 4 h using temperature programming to obtain the catalyst LC-4. The properties of the carrier and the corresponding catalyst are shown in Table 7.

Example III-5

66.6 g zeolite BSS-4 (with a dry basis of 90 wt %), 142.9 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled to paste, and squeezed into strips, the strips are dried at 110° C. for 4 h, and then calcined at 550° C. for 4 h to obtain the carrier CS-5. The properties are shown in Table 7.

The carrier is immersed in an impregnation liquid containing tungsten and nickel at room temperature for 2 h, dried at 120° C. for 4 h, calcined at 500° C. for 4 h using temperature programming to obtain the catalyst LC-5. The properties of the carrier and the corresponding catalyst are shown in Table 7.

Example III-6

88.9 g zeolite BSS-7 (with a dry basis of 90 wt %), 114.2 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled to paste, and squeezed into strips, the strips are dried at 110° C. for 4 h, and then calcined at 550° C. for 4 h to obtain the carrier CS-6. The properties are shown in Table 7.

The carrier is immersed in an impregnation liquid containing tungsten and nickel at room temperature for 2 h, dried at 120° C. for 4 h, calcined at 500° C. for 4 h using temperature programming to obtain the catalyst LC-6. The properties of the carrier and the corresponding catalyst are shown in Table 7.

Example III-7

22.2 g zeolite BSS-8 (with a dry basis of 90 wt %), 200.0 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled to paste, and squeezed into strips, the strips are dried at 110° C. for 4 h, and then calcined at 550° C. for 4 h to obtain the carrier CS-7. The properties are shown in Table 7.

The carrier is immersed in an impregnation liquid containing tungsten and nickel at room temperature for 2 h, dried at 120° C. for 4 h, calcined at 500° C. for 4 h using temperature programming to obtain the catalyst LC-7. The properties of the carrier and the corresponding catalyst are shown in Table 7.

Example III-8

33.3 g zeolite BSS-1 (with a dry basis of 90 wt %), 200.0 g macroporous alumina (with a pore volume of 1.0 mL/g, a BET surface area of 400 m$^2$/g and a dry basis of 70 wt %), and 133.3 g adhesive (with a dry basis of 30 wt % and a nitric acid/microporous alumina molar ratio of 0.4) are put in a milling machine for milling, filled with water, milled to paste, and squeezed into strips, the strips are dried at 110° C. for 4 h, and then calcined at 550° C. for 4 h to obtain the carrier CS-8. The properties are shown in Table 7.

The carrier is immersed in an impregnation liquid containing tungsten and nickel at room temperature for 2 h, dried at 120° C. for 4 h, calcined at 500° C. for 4 h using temperature programming to obtain the catalyst LC-8. The properties of the carrier and the corresponding catalyst are shown in Table 7.

Comparative Example III-1

The carrier is prepared by using the method of Example III-2, except that the zeolite BSS-2 is replaced by the same weight of β zeolite BD-2, the obtained carrier is numbered CDS-1. The properties are shown in Table 7.

The catalyst is prepared by the method of Example III-2 using the above mentioned carrier, the obtained catalyst is numbered LCD-1. The properties of the carrier and the corresponding catalyst are shown in Table 7.

Comparative Example III-2

The carrier is prepared by using the method of Example III-3, except that the zeolite BSS-6 is replaced by the same weight of β zeolite BD-3, the obtained carrier is numbered CDS-2. The properties are shown in Table 7.

The catalyst is prepared by the method of Example III-3 using the above mentioned carrier, the obtained catalyst is numbered LCD-2. The properties of the carrier and the corresponding catalyst are shown in Table 7.

Comparative Example III-3

The carrier is prepared by using the method of Example III-7, except that the zeolite BSS-8 is replaced by the same weight of β zeolite BD-1, the obtained carrier is numbered CDS-3. The properties are shown in Table 7.

The catalyst is prepared by the method of Example III-3 using the above mentioned carrier, the obtained catalyst is numbered LCD-3. The properties of the carrier and the corresponding catalyst are shown in Table 7.

Comparative Example III-4

The carrier is prepared by using the method of Example III-8, except that the zeolite BSS-1 is replaced by the same weight of β zeolite BD-4, the obtained carrier is numbered CDS-4. The properties are shown in Table 7.

The catalyst is prepared by the method of Example III-8 using the above mentioned carrier, the obtained catalyst is numbered LCD-4. The properties of the carrier and the corresponding catalyst are shown in Table 7.

Comparative Example III-5

The carrier is prepared by using the method of Example III-8, except that the zeolite BSS-1 is replaced by the same weight of β zeolite BD-5, the obtained carrier is numbered CDS-5. The properties are shown in Table 7.

The catalyst is prepared by the method of Example III-8 using the above mentioned carrier, the obtained catalyst is numbered LCD-5. The properties of the carrier and the corresponding catalyst are shown in Table 7.

Comparative Example III-6

The carrier is prepared by using the method of Example III-8, except that the zeolite BSS-1 is replaced by the same weight of β zeolite BD-6, the obtained carrier is numbered CDS-6. The properties are shown in Table 7.

The catalyst is prepared by the method of Example III-8 using the above mentioned carrier, the obtained catalyst is numbered LCD-6. The properties of the carrier and the corresponding catalyst are shown in Table 7.

Comparative Example III-7

The carrier is prepared by using the method of Example III-8, except that the zeolite BSS-1 is replaced by the same weight of β zeolite BD-7, the obtained carrier is numbered CDS-7. The properties are shown in Table 7.

The catalyst is prepared by the method of Example III-8 using the above mentioned carrier, the obtained catalyst is numbered LCD-7. The properties of the carrier and the corresponding catalyst are shown in Table 7.

TABLE 7 physical and chemical properties of the catalyst carriers and the catalysts

| | Example No. | | | | | | | |
|---|---|---|---|---|---|---|---|---|
| | III-1 | III-2 | III-3 | III-4 | III-5 | III-6 | III-7 | III-8 |
| carrier | | | | | | | | |
| No. | CS-1 | CS-2 | CS-3 | CS-4 | CS-5 | CS-6 | CS-7 | CS-8 |
| β zeolite, wt % | 15 | 20 | 30 | 35 | 30 | 40 | 10 | 15 |
| Alumina | | | | balance | | | | |
| BET surface area, m$^2$/g | 406 | 392 | 429 | 435 | 431 | 455 | 391 | 410 |
| Pore volume, mL/g | 0.72 | 0.66 | 0.61 | 0.58 | 0.62 | 0.54 | 0.78 | 0.73 |
| Catalyst | | | | | | | | |
| No. | LC-1 | LC-2 | LC-3 | LC-4 | LC-5 | LC-6 | LC-7 | LC-8 |
| WO$_3$, wt % | 24.6 | 25.8 | 21.5 | 18.6 | 21.8 | 26.3 | 22.5 | 23.5 |
| NiO, wt % | 6.1 | 6.3 | 5.6 | 4.5 | 5.9 | 6.9 | 6.3 | 6.3 |

| | Comparative Example No. | | | | | | |
|---|---|---|---|---|---|---|---|
| | III-1 | III-2 | III-3 | III-4 | III-5 | III-6 | III-7 |
| carrier | | | | | | | |
| No. | CDS-1 | CDS-2 | CDS-3 | CDS-4 | CDS-5 | CDS-6 | CDS-7 |
| β zeolite, wt % | 20 | 30 | 10 | 15 | 15 | 15 | 15 |
| Alumina | | | | balance | | | |
| BET surface area, m$^2$/g | 385 | 406 | 355 | 421 | 369 | 388 | 369 |
| Pore volume, mL/g | 0.64 | 0.59 | 0.68 | 0.54 | 0.62 | 0.58 | 0.57 |

TABLE 7-continued physical and chemical properties of the catalyst carriers and the catalysts Catalyst

| No. | LCD-1 | LCD-2 | LCD-3 | LCD-4 | LCD-5 | LCD-6 | LCD-7 |
|---|---|---|---|---|---|---|---|
| $WO_3$, wt % | 25.3 | 22.9 | 22.5 | 23.6 | 23.8 | 23.7 | 23.5 |
| NiO, wt % | 6.5 | 6.0 | 6.4 | 6.2 | 6.3 | 6.1 | 6.2 |

Catalytic Performance Evaluation 3

The catalyst is evaluated on a fixed bed hydrogenation test device. The evaluation comprises the following conditions: a total reaction pressure of 10.01 MPa, a hydrogen-oil volume ratio of 600, and a LHSV of 2.0 $h^{-1}$. FCC diesel oil is taken as the raw oil. The properties of the raw oil are listed in Table 8. The catalysts LC-1 to LC-8 and LCD-1 to LCD-7 are evaluated in the same process conditions. The obtained evaluation results are listed in Table 9.

TABLE 8 properties of raw oil

| Raw oil | FCC diesel oil -1 | FCC diesel oil -2 |
|---|---|---|
| Density (20° C.), $g/cm^3$ | 0.9423 | 0.9611 |
| Boiling Point/° C. | | |
| IBP/10% | 186/255 | 191/234 |
| 30%/50% | 286/310 | 259/286 |
| 70%/90% | 330/349 | 321/364 |
| 95%/EBP | 359/369 | 377/382 |
| Solidification Point/° C. | 5 | 3 |
| $S/\mu g \cdot g^{-1}$ | 8568 | 13603 |
| $N/\mu g \cdot g^{-1}$ | 1150 | 1088 |
| Cetane number | 25 | 15.6 |
| C, wt % | 88.46 | 88.53 |
| H, wt % | 11.07 | 9.31 |

TABLE 9 performance evaluation results

| Catalyst | LC-2 | LC-1 | LC-3 | LC-4 | LC-5 | LC-6 | LC-7 | LC-8 |
|---|---|---|---|---|---|---|---|---|
| Raw oil | FCC diesel oil-1 | | | | FCC diesel oil-2 | | | |
| LHSV, $h^{-1}$ | 2.0 | 2.0 | 2.0 | 2.0 | 2.0 | 2.0 | 2.0 | 2.0 |
| Total reaction pressure, MPa | 10.0 | 10.0 | 10.0 | 10.0 | 10.0 | 10.0 | 10.0 | 10.0 |
| Hydrogen-oil volume ratio | 600:1 | 600:1 | 600:1 | 600:1 | 600:1 | 600:1 | 600:1 | 600:1 |
| Reaction temperature, ° C. | 365 | 363 | 360 | 358 | 362 | 356 | 368 | 367 |
| Product yield and properties | | | | | | | | |
| Naphtha | | | | | | | | |
| Yield, wt % | 2.5 | 2.4 | 2.5 | 2.1 | 2.9 | 3.1 | 2.9 | 2.9 |
| Aromatics potential, wt % | 52.6 | 52.3 | 52.3 | 51.6 | 51.9 | 50.2 | 52.3 | 52.9 |
| Diesel oil | | | | | | | | |
| Yield, wt % | 96.4 | 96.3 | 96.7 | 96.9 | 96.1 | 95.8 | 96.7 | 96.3 |
| Density (20° C.)/ $g.cm^{-3}$ | 0.8355 | 0.8365 | 0.8366 | 0.8369 | 0.8356 | 0.8349 | 0.8357 | 0.8359 |
| $T_{95}$/° C. | 352 | 353 | 356 | 352 | 354 | 349 | 348 | 351 |
| Solidification Point/° C. | −25 | −26 | −27 | −26 | −29 | −36 | −28 | −27 |
| Cetane number | 50.2 | 49.8 | 50.2 | 50.6 | 50.8 | 52.1 | 50.9 | 51.1 |
| $S/\mu g \cdot g^{-1}$ | 6 | 5 | 6 | 7 | 6 | 8 | 6 | 5 |

| Catalyst | LCD-1 | LCD-2 | LCD-3 | LCD-4 | LCD-5 | LCD-6 | LCD-7 |
|---|---|---|---|---|---|---|---|
| Raw oil | FCC diesel oil-1 | | | | FCC diesel oil-2 | | |
| LHSV/$h^{-1}$ | 2.0 | 2.0 | 2.0 | 2.0 | 2.0 | 2.0 | 2.0 |
| Total reaction pressure, MPa | 10.0 | 10.0 | 10.0 | 10.0 | 10.0 | 10.0 | 10.0 |
| Hydrogen-oil volume ratio | 600:1 | 600:1 | 600:1 | 600:1 | 600:1 | 600:1 | 600:1 |
| Reaction temperature/° C. | 373 | 370 | 380 | 382 | 389 | 386 | 385 |
| Product yield and properties | | | | | | | |
| Naphtha | | | | | | | |
| Yield, wt % | 3.8 | 3.2 | 4.8 | 5.9 | 6.3 | 7.5 | 5.9 |
| Aromatics potential, wt % | 48.9 | 49.2 | 46.5 | 40.3 | 39.6 | 38.6 | 42.6 |

TABLE 9-continued performance evaluation results

Diesel oil

| | | | | | | | |
|---|---|---|---|---|---|---|---|
| Yield, wt % | 92.5 | 93.3 | 91.6 | 90.8 | 89.3 | 87.2 | 91.6 |
| Density (20° C.)/g.cm$^{-3}$ | 0.8372 | 0.8369 | 0.8356 | 0.8561 | 0.8563 | 0.8766 | 0.8355 |
| $T_{95}$/° C. | 356 | 355 | 356 | 351 | 352 | 353 | 356 |
| Solidification Point/° C. | −13 | −12 | −5 | −8 | −12 | −9 | −8 |
| Cetane number | 44.7 | 45.6 | 43.5 | 41.0 | 35.4 | 30.2 | 42.1 |
| S/µg · g$^{-1}$ | 15 | 13 | 18 | 25 | 30 | 16 | 19 |

It can be seen from the evaluation results of Table 9 that the diesel oil yield and product quality of the catalysts prepared by the present invention are better than those of the reference catalysts in the same process conditions.

What is claimed is:

1. A β zeolite having a $SiO_2/Al_2O_3$ molar ratio of 30-150, non-skeleton aluminum of not more than 2% based on the total aluminum, Si(OAl)-coordinated silicon atom of not less than 95% based on silicon atom in a skeleton structure.

2. The β zeolite according to claim 1, wherein the β zeolite has a $SiO_2/Al_2O_3$ molar ratio of 40-150, non-skeleton aluminum of not more than 1% based on the total aluminum, Si(OAl)-coordinated silicon atom of 96%-99% based on silicon atom in a skeleton structure.

3. The β zeolite according to claim 1, wherein the β zeolite has a relative crystallinity of 100%-140%.

4. The β zeolite according to claim 1, wherein the β zeolite has an IR acid in an amount of 0.1-0.5 mmol/g, and a medium strong acid in an acid amount of not less than 80% based on the total acid amount, as measured by $NH_3$-TPD method.

5. The β zeolite according to claim 4, wherein the β zeolite has an IR acid in an amount of 0.15-0.45 mmol/g, and a medium strong acid in an acid amount of 85-95% based on the total acid amount, as measured by $NH_3$-TPD method.

6. The β zeolite according to claim 1, wherein the β zeolite has a $Na_2O$ content of not more than 0.15 wt %.

7. The β zeolite according to claim 1, wherein the β zeolite has a BET surface area of 400 m$^2$/g-800 m$^2$/g and a total pore volume of 0.30 mL/g-0.50 mL/g.

8. A preparation method of a β zeolite of claim 1, comprising:
   (1) contacting β zeolite raw material powder with water vapor at a temperature of 500-650° C. for 5-10 hours; and
   (2) contacting the product from step (1) with ammonium hexafluorosilicate, then filtering, washing and drying to obtain the β zeolite.

9. The method according to claim 8, wherein step (1) further comprises heating the raw material powder a heating rate of 50-150° C./h to 250-450° C. before introducing the water vapor, continuing heating to 500-650° C., and then maintaining the temperature for 5-10 h.

10. The method according to claim 8, wherein in step (1), the water vapor passes through the β zeolite raw material powder at 50-100 L/h per kilogram of the β zeolite raw material powder.

11. The method according to claim 8, wherein the β zeolite raw material powder in step (1) has a $SiO_2/Al_2O_3$ molar ratio of 22.5-28.5, and a $Na_2O$ content of 1.0 wt %-3.0 wt %.

12. The method according to claim 8, wherein the ammonium hexafluorosilicate used in step (2) is in an aqueous solution having an ammonium hexafluorosilicate concentration of 10 g-60 g/100 mL, and a liquid-solid volume ratio of the aqueous solution of ammonium hexafluorosilicate and the β zeolite raw material is 3:1-15:1.

13. The method according to claim 8, wherein step (2) is carried out at a temperature of 40-120° C. and for a duration of 0.5-8.0 h.

14. A hydrogenation catalyst containing a hydrogenation active metal component and a carrier, wherein the carrier contains a β zeolite of claim 1.

15. The hydrogenation catalyst according to claim 14, wherein based on a total weight of the carrier, the carrier comprises 5%-40% of the β zeolite and 60%-95% of alumina.

16. The hydrogenation catalyst according to claim 15, wherein based on the total weight of the carrier, the carrier comprises 3%-20% of the β zeolite, 10%-70% of an amorphous silica-alumina, and 15%-70% of the alumina.

17. The hydrogenation catalyst according to claim 16, wherein the amorphous silica-alumina has 5 wt %-40 wt % of $SiO_2$, a pore volume of 0.6-1.1 mL/g, and a BET surface area of 300-500 m$^2$/g.

18. The hydrogenation catalyst according to claim 15, wherein based on the total weight of the carrier, the carrier has 5%-20% of the β zeolite, 10%-40% of Y zeolite, and 40%-85% of the alumina.

19. The hydrogenation catalyst according to claim 18, wherein the Y zeolite has a BET surface area of 850 m$^2$/g-950 m$^2$/g, a total pore volume of 0.43 mL/g-0.55 mL/g, a $SiO_2/Al_2O_3$ molar ratio of 20-150, a cell parameter of 2.425-2.433 nm, and an IR acid in an amount of 0.1-0.4 mmol/g.

20. The hydrogenation catalyst according to claim 14, wherein the hydrogenation active metal component comprises Group VIB metal of molybdenum and/or tungsten, and Group VIII metal of cobalt and/or nickel; and in the hydrogenation catalyst, based on a total amount of the catalyst, the catalyst comprises 10 wt %-30 wt % of the Group VIB metal oxide and 4 wt %-8 wt % of the Group VII metal oxide.

* * * * *